United States Patent [19]
Ohta et al.

[11] Patent Number: 5,050,221
[45] Date of Patent: Sep. 17, 1991

[54] IMAGE GENERATING APPARATUS

[75] Inventors: Junichi Ohta; Yoshiyuki Namizuka, both of Yokohama, Japan

[73] Assignee: Ricoh Company, Ltd., Japan

[21] Appl. No.: 479,617

[22] Filed: Feb. 12, 1990

[30] Foreign Application Priority Data

| Feb. 13, 1989 | [JP] | Japan | 1-31201 |
| May 19, 1989 | [JP] | Japan | 1-124427 |
| May 31, 1989 | [JP] | Japan | 1-135965 |
| Sep. 5, 1989 | [JP] | Japan | 1-228257 |
| Dec. 15, 1989 | [JP] | Japan | 1-323955 |

[51] Int. Cl.$^5$ ............................................. G06K 9/34
[52] U.S. Cl. .................................................... 382/9
[58] Field of Search ................................ 382/9, 57; 340/747-750

[56] References Cited

U.S. PATENT DOCUMENTS

| 3,930,228 | 12/1975 | Spanjersberg | 382/9 |
| 4,136,332 | 1/1979 | Kadota et al. | 382/9 |
| 4,695,828 | 9/1987 | Yamamoto | 382/9 |
| 4,932,065 | 6/1990 | Feldgajer | 382/9 |
| 4,933,977 | 6/1990 | Ohnishi et al. | 382/9 |

FOREIGN PATENT DOCUMENTS

| 54-118720 | 9/1979 | Japan . |
| 58-85670 | 5/1983 | Japan . |
| 61-255483 | 11/1986 | Japan . |
| 62-281082 | 12/1987 | Japan . |
| 62-290984 | 12/1987 | Japan . |
| 1-53281 | 3/1989 | Japan . |

OTHER PUBLICATIONS

Yutaka Ohsawa et al, "Picture Processing Using Multi-Dimensional Data Management Structure-Vectorization of Drawings," *Institute of Electronics and Communication Engineers of Japan*, vol. J68-D, No. 4, pp. 845-852.

Primary Examiner—Stephen Brinich
Attorney, Agent, or Firm—Mason, Fenwick & Lawrence

[57] ABSTRACT

An image generating apparatus having a character recognizing function and a graphic function. Recognizing means recognizes contents of a document, while arithmetic operating means performs arithmetic operations with the recognized information. Graph formating means produces image data for graphing the results of arithmetic operations and delivers them to printing means, whereby the contents of the document are outputted in the form of a graph. A categorzied total table representative of the recognized information is outputted together with the graph. The results of recognition by the recognizing means are correctable. The recognized information from the recognizing means is optically indicated on a display.

9 Claims, 28 Drawing Sheets

FIG. 3

| | | | | | | | | | | |
|---|---|---|---|---|---|---|---|---|---|---|
| KIND OF GRAPH | | 1 ~21 | | | | | | | | |

GRAPH DATA (22):

| 1 | 2 | 2 | 1 | 4 | 0 | 1 | 6 | 3 | 1 | 8 | 1 | 1 | 9 | 7 |
|---|---|---|---|---|---|---|---|---|---|---|---|---|---|---|
|   | 4 | 1 |   | 5 | 9 |   | 8 | 0 | 1 | 0 | 2 | 1 | 2 | 1 |
|   | 2 | 2 |   | 4 | 0 |   | 4 | 2 |   | 5 | 9 |   | 6 | 2 |

ORDINATE MIN    | | 0 | ~23

ORDINATE MAX    | 2 | 0 | 0 | ~24

ORDINATE INT     | | 4 | 0 | ~25

GRAPH TITLE (26): S A L E S | O F | P R O D U C T S

ABSCISSA TITLE (27): Y E A R

ORDINATE TITLE (28): S A L E S | ( M I L L I O N | Y E N )

FIG. 10

| | | | | |
|---|---|---|---|---|
| | | 1 | | |
| | 6 | 3 | 6 | |
| | 5 | 0 | 4 | |
| | | 1 | | |
| | 1 | 0 | 2 | |
| | 5 | 4 | 6 | |
| | | | | |
| | 6 | 5 | 7 | |
| | 6 | 1 | 6 | |
| | | | | |
| | 5 | 7 | 5 | |
| | 2 | 8 | 4 | |
| | | | | |
| | 3 | 5 | 1 | |
| | 9 | 1 | 3 | |

Labels: 224, 225, 242, 243, 244, 244, 245, 244, 233, 246, 233

Side boxes:
| 4 | 0 | 0 |
| 1 | 0 |
| 5 | 0 |

FIG. 12

| | | | | |
|---|---|---|---|---|
| | | 9 | 1 | 3 |
| | | 3 | 5 | 1 |
| | | | | |
| | | 2 | 8 | 4 |
| 241 | | 5 | 9 | 5 | 246a
| | | | | |
| | | 6 | 1 | 6 |
| | | 6 | 5 | 7 |
| | | | | |
| | | 5 | 4 | 6 |
| | | 1 | 0 | R | 245a
| | | | 1 | |
| | | 5 | 0 | 4 | 243a
| | | 6 | 3 | 6 |
| | | | 1 | | 244a
| / | | | | |

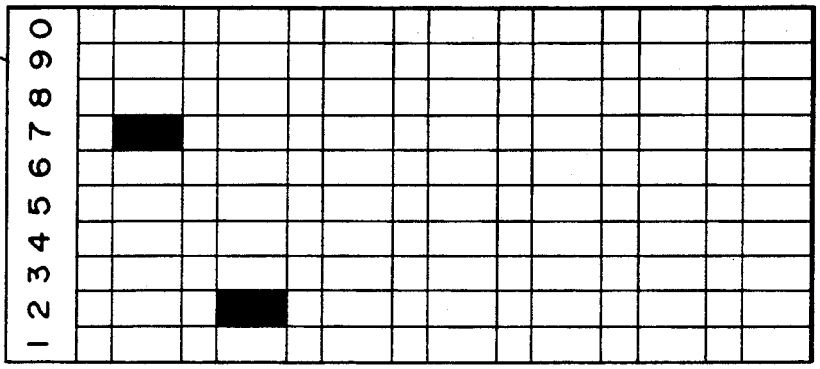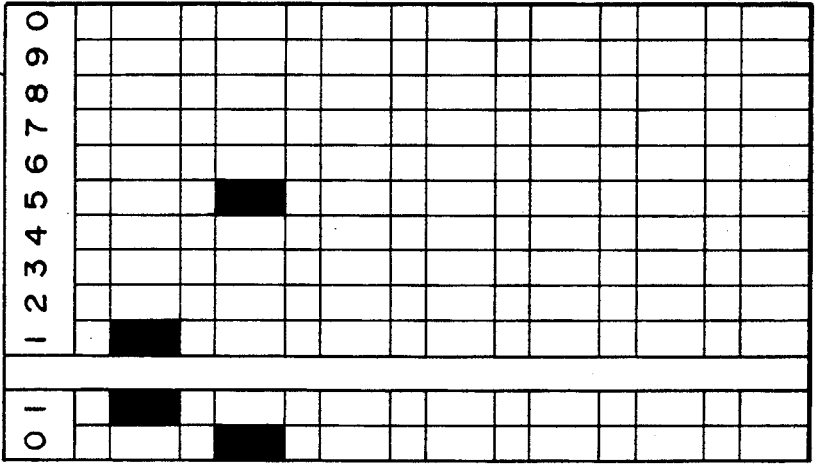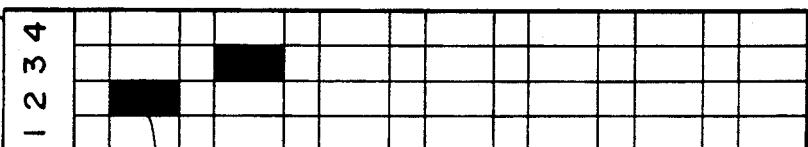
FIG. 21

FIG. 26

| | | | | | | |
|---|---|---|---|---|---|---|
| | 3 | 3 | 1 | 1 | 9 | 9 |
| | | | 5 | 5 | 3 | 3 |
| | 4 | 4 | 8 | 8 | 2 | 2 |
| | 5 | 5 | 9 | 7 | 5 | 5 |
| | 6 | 6 | 1 | 1 | 6 | 6 |
| | 7 | 7 | 5 | 5 | 6 | 6 |
| | 6 | 6 | 4 | 4 | 5 | 5 |
| | 1 | 1 | | | | |
| | 2 | ? | 0 | 0 | 1 | 1 |
| | 4 | 4 | 0 | 0 | 5 | 5 |
| | 1 | 1 | | | | |
| | 6 | 6 | 3 | 3 | 6 | 6 |
| | | | | | | |

299, 246a, 245a, 243a, 243b, 244a

IMAGE GENERATING APPARATUS

BACKGROUND OF THE INVENTION

The present invention relates to an image generating apparatus having a character recognizing function and a graphic function.

Extensively used in the imaging art today are a character recognizing device capable of reading and recognizing characters which are written in paper, and a graphic device capable of drawing a desired image based on image data, especially a graphing device which processes numerical data to form a graph. Such devices have heretofore been proposed in various forms, as enumerated below.

(1) With one prior art graphing device, a person inputs and edits graph data while watching a display and by using a keyboard, mouse, etc. The resulting graph is outputted by a printer or similar output unit. This kind of graphing device is applicable to a digital copier or similar equipment and is implemented as a computer application, software, or exclusive computer.

(2) Japanese Patent Laid-Open Publication (Kokai) No. 61-255483, for example, discloses an optical character reader (OCR) of the type reading a slip on which frames are printed by using ordinary printing ink as distinguished from dropout colors. This OCR is directed toward decreasing the cost of slips and promoting easy identification of frames in which characters may be written.

(3) Japanese Patent Laid-Open Publcation (Kokai) No. 62-290984, for example, proposes a slip having frames each being provided with a guide pattern therein beforehand. One may trace desired segments of the guide pattern. This uniformizes the style of handwriting and thereby improves the matching of input patterns and a registered dictionary.

(4) An image generating apparatus capable of printing out a combined image on a special paper sheet which is customarily attached to a gift is shown and described in Japanese Patent Laid-Open Publication No. 58-85670, for example. Specifically, the apparatus reads an application blank which has been filled in a predetermined format by marking a portion of interest. The apparatus determines the kind of the gift on the basis of the marked portion of the application, reads the pattern of a word associated with the determined kind out of a memory, combines the read pattern with the pattern of a sender's name written in the application blank, and print out the combined patterns on the paper sheet. This allows a desired pattern intended for a gift to be selected and to be combined with the sender's name with ease.

(5) A facsimile machine advantageously usable to send and output a graph is taught in Japanese Patent Laid-Open Publication (Kokai) No. 54-118720, for example. This type of facsimile machine scans a document two-dimensionally, codes the optically read data, extracts the codes and quantities associated with individual items, and transmits them to a destination. At the destination, a graph is generated by using the codes and quantities. Such a facsimile machine cuts down the required transmission capacity by coding and, therefore, promotes effective use of a communication channel while reducing the transmission time.

(6) Japanese Patent Laid-Open Publication (Kokai) No. 62-281082, for example, discloses a character recognizing device which recognizes handwritten characters or similar symbols, prints out the recognized symbols, and informs a person of the similarity or difference between the inputted symbols and the recognized symbols. The result of evaluation outputted together with the result of recognition helps educating a copyist as to the entry of characters and urges the copyist to acquire a writing method which is desirable for accurate character recognition.

However, all the prior art implementations (1) to (6) described above have problems left unsolved. The graphing device (1), for example, formats and outputs a graph automatically and thereby reduces the processing time, but it relies on manual work when it comes to entering and editing graph data. Hence, the entering and editing time occupies substantial part of the total graphing time. Specifically, this prior art device is implemented as a computer application, software, or exclusive computer and is used with a keyboard, tablet, mouse, or similar inputting implement, as stated earlier. Such a device is, therefore, difficult to use for those who are not familiar with computers and cannot be handled without resorting to substantial knowledge regarding the complicated operation flows. A problem with the OCR (2) is that when the frames are broken off, blurred or smeared, the frames and the characters cannot be accurately separated from each other, resulting in misreading. For example, the frames are apt to blur when use is made of a copy of an original slip. The slip (3) is disadvantageous in that it is not easy for a person to write characters in the ordinary order of strokes. The image generating apparatus (4) does not allow more than a certain number of patterns to be stored beforehand and, since the sender's name is simply copied, it is not capable of executing any other secondary processing which uses the recognizing means. The application of the apparatus (4) is, therefore, substantially limited to gifts. The facsimile machine (5) basically sends a graph or similar graphic image faithfully and lacks a function of recognizing the contents of a graph and transforming them into another format. Further, the character recognizing device (6) informs a copyist only of whether or not the handwritten characters have defects, i.e., concrete image information is not available. Hence, the copyist cannot readily estimate the cause of misreading. Generally, when a document is read by a scanner, the read images and the written characters are not always identical. For example, when the reading density of the scanner is low, the read images are often blurred or broken off; when it is high, the read images often suffer from batter. Further, it is likely that noise is introduced in the output of the scanner or an inclined image is entered, depending on the position of a document. It follows that the cause of misreading can in many cases be estimated if read images themselves are displayed. With the apparatus (6), however, the estimation of the cause of misreading is not easy because the apparatus does not have such a displaying function. Thus, the current OCR technologies are directed toward improving recognizability only and are not concerned with how to correct misread characters or with the correction of a slip which may be needed later despite exact recognition.

SUMMARY OF THE INVENTION

It is therefore an object of the present invention to provide an image generating apparatus capable of enhancing efficient manual operations for entering data to be graphed.

It is another object of the present invention to provide an image generating apparatus capable of recognizing with accuracy even characters which are written in a slip adapted for OCR in an ordinary style of handwriting, thereby executing highly reliable graphing and totalizing processing with the outputs of an OCR.

It is another object of the present invention to provide an image generating apparatus capable of recognizing the contents of a document and, at the same time, outputting them in the form of a graph.

It is another object of the present invention to provide an image generating apparatus capable of displaying an image signal outputted by a reading section as an image.

It is another object of the present invention to provide a generally improved image generating apparatus.

In accordance with the present invention, an image generating apparatus comprises an image inputting unit for producing binary image data by optically reading a document in which numerical values for graphing, characters representative of a title and so forth are handwritten, a character image cleaving unit for cleaving images representative of the characters and numerals located at predetermined positions out of the binary image data, a character recognizing unit for outputting character codes and numeral codes by recognizing the cleaved images, a graph formating unit for producing a graph image on the basis of character and numeral data recognized by the character recognizing unit, and a mode selecting unit for selecting either one of an ordinary copy mode and a graph mode.

Also, in accordance with the present invention, an image generating apparatus comprises a reading unit for producing an image signal by reading a slip in which numerals are handwritten in a predetermined format, an analog-to-digital converting unit for converting the image signal into a digital image signal, a preserving unit for preserving the digital image signal, a recognizing unit for recognizing the digital image signal preserved by the preserving unit, a graph formating unit for totalizing results of recognition by the recognizing unit and formating the totalized results into a graph, a printing unit for printing out the graph formated by the graph formating unit and the results of recognition in combination, a storing unit for storing a pattern of the slip on which frames for writing numerals are defined by lines and a style of handwriting of the numerals is indicated together with the lines, an operating unit for commanding print-out of the pattern of the slip stored in the storing unit, and a selecting unit for selecting either one of an ordinary copy mode and a graph mode.

Further, in accordance with the present invention, an image generating apparatus comprises a reading unit for reading a slip in which numerals are handwritten in a predetermined format, a recognizing unit for recognizing contents read by the reading unit, a graph formating unit for performing arithmetic operations with the recognized contents and formating the recognized contents into a graph on the basis of results of the arithmetic operations, an operating unit for instructing the graph formating unit the kind of a graph to be produced, a printing unit for combining and printing out the graph formated by the graph formating unit and data representative of the results of recognition by the recognizing unit, and a correcting unit for correcting the recognized contents.

Further, in accordance with the present invention, an image generating apparatus comprises a reading unit for reading a slip in which numerals are handwritten in a predetermined format, an image storing unit for storing contents read by the reading unit as an image, a line recognizing unit for recognizing, on the basis of the contents read by the reading unit, lines which define frames on the slip, a separating unit for separating the lines recognized by the line recognizing unit and character portions, a character recognizing unit for recognizing characters included in the separated character portions, a displaying unit for optically displaying results of recognition by the character recognizing unit, a character storing unit for storing the results of recognition by the character recognizing unit, a location indicating unit for indicating locations of the character storing unit where the results of recognition are stored, a correcting unit for correcting the recognized contents stored in the character storing unit, an arithmetic operating unit for performing arithmetic operations with the recognized contents stored in the character storing unit, a graph formating unit for formating the recognized contents into a graph on the basis of results of the arithmetic operations, a printing unit for combining and printing out the graph formated by the graph formating unit and the results of recognition by the character recognizing unit, a graph selecting unit for selecting a graph of a desired kind, an interrupting unit for executing, while recognizing and graphing processing is under way, another image generating processing, and a mode selecting unit for selecting either one of an ordinary copy mode and a graph mode.

Further, in accordance with the present invention, an image generating apparatus comprises a reading unit for reading a slip, an image storing unit for storing contents read by the reading unit as an image, a line rcognizing unit for recognizing lines which define frames on the slip and are included in image data stored in the image storing means, a separating unit for separating the lines recognized by the line recognizing unit and character portions, a character recognizing unit for recognizing characters included in the character portions, a character storing unit for storing results of recognition by the character recognizing unit, a printing unit for printing out the results of recognition stored in the character storing unit, a correcting unit for correcting the recognized contents stored in the character storing unit, an identifying unit for identifying contents of a mark sheet, an address calculating unit for determining, on the basis of a mark on the mark sheet identified by the identifying unit, an address of a location where one of the results of recognition is stored, an arithmetic operating unit for performing arithmetic operations with the recognized contents stored in the character storing unit, a graph formating unit for formating the recognized contents into a graph on the basis of results of the arithmetic operations, a printing unit for combining and printing out the graph formated by the graph formating unit and the results of recognition, a graph selecting unit for selecting a graph of a desired kind, an interrupting unit for executing, while recognizing and graphing processing is under way, another image generating processing, a mode selecting unit for selecting either one of an ordinary copy mode and a graph mode, a switching unit for switching over mark identifying processing and character recognizing processing, and a conflict preventing unit for preventing the graphed data from conflicting with data particular to the other image generating processing.

Further, in accordance with the present invention, an image generating apparatus comprises a reading unit for reading a slip in which numerals are handwritten in a predetermined format, an image storing unit for storing contents read by the reading unit as an image, a line recognizing unit for recognizing, on the basis of the contents read by the reading unit, lines which define frames, a separating unit for separating the lines and character portions on the basis of results of recognition by the recognizing unit, a character recognizing unit for recognizing characters included in the character portions, a character storing unit for storing results of recognition by the character recognizing unit, a printing unit for printing out the results of recognition by the character recognizing unit, an image displaying unit for displaying an image which is read by the reading unit and to be recognized, in addition to the results of recognition, a correcting unit for correcting contents recognized by the character recognizing unit, a location indicating unit for indicating a location where a content to be corrected is stored, an inputting unit for inputting a portion to be corrected and a correct value, a calculating unit for performing arithmetic operations with the contents recognized by the character recognizing unit, a graph formating unit for formating the recognized contents into a graph on the basis of results of arithmetic operations, a printing unit for printing out the graph formated by the graph formating unit and the results of recognition, a graph selecting unit for selecting a graph of a desired kind, an interrupting unit for executing, while recognizing and graphing processing is under way, another image generating processing, a mode selecting unit for selecting either one of an ordinary copy mode and a graph mode, and a conflict preventing unit for preventing results of the recognizing and graphing procedure from conflicting with results of the other image generating processing.

Further, in accordance with the present invention, an image generating apparatus comprises a reading unit for reading a slip in which numerals are handwritten in a predetermined format, an image storing unit for storing contents read by the reading unit as an image, a line recognizing unit for recognizing, on the basis of the contents read by the reading unit, lines which define frames, a separating unit for separating the lines and character portions on the basis of results of recognition by the line recognizing unit, a character recognizing unit for recognizing characters included in the character portions, a storing unit for storing results of recognition by the character recognizing unit, a printing unit for printing out the results of recognition by the character recognizing unit, a correcting unit for correcting contents recognized by the character recognizing unit, a location indicating unit for indicating a location of the storing unit where any of the contents to be corrected is stored, an inputting unit for inputting a portion to be corrected and a correct value, a calculating unit for performing arithmetic operations with the contents recognized by the character recognizing unit, a graph formating unit for formating the recognized contents into a graph on the basis of results of the arithmetic operations, a printing unit for combining and printing out the graph formated by the graph formating unit and the results of recognition, a graph selecting unit for selecting a graph of a desired kind, an interrupting unit for executing, while recognizing and graphing processing is under way, another image generating processing, a mode selecting unit for selecting either one of an ordinary copy mode and a graph mode, and a conflict preventing unit for preventing results of the recognizing and graphing processing from conflicting with results particular to the other image generating processing.

BRIEF DESCRIPTION OF THE DRAWINGS

The above and other objects, features and advantages of the present invention will become more apparent from the following detailed description taken with the accompanying drawings in which:

FIG. 3 shows a document applicable to the first embodiment;

FIG. 10 shows a slip usable with the third embodiment;

FIG. 12 shows specific results of recognition involving a character which has been rejected due to illigibility;

FIG. 21 shows a document for correction applicable to the fifth embodiment;

FIG. 26 shows a recognition result table which may be printed out by a printing section of the seventh embodiment on the basis of an image signal and recognized information;

DESCRIPTION OF THE PREFERRED EMBODIMENTS

Figure 1:
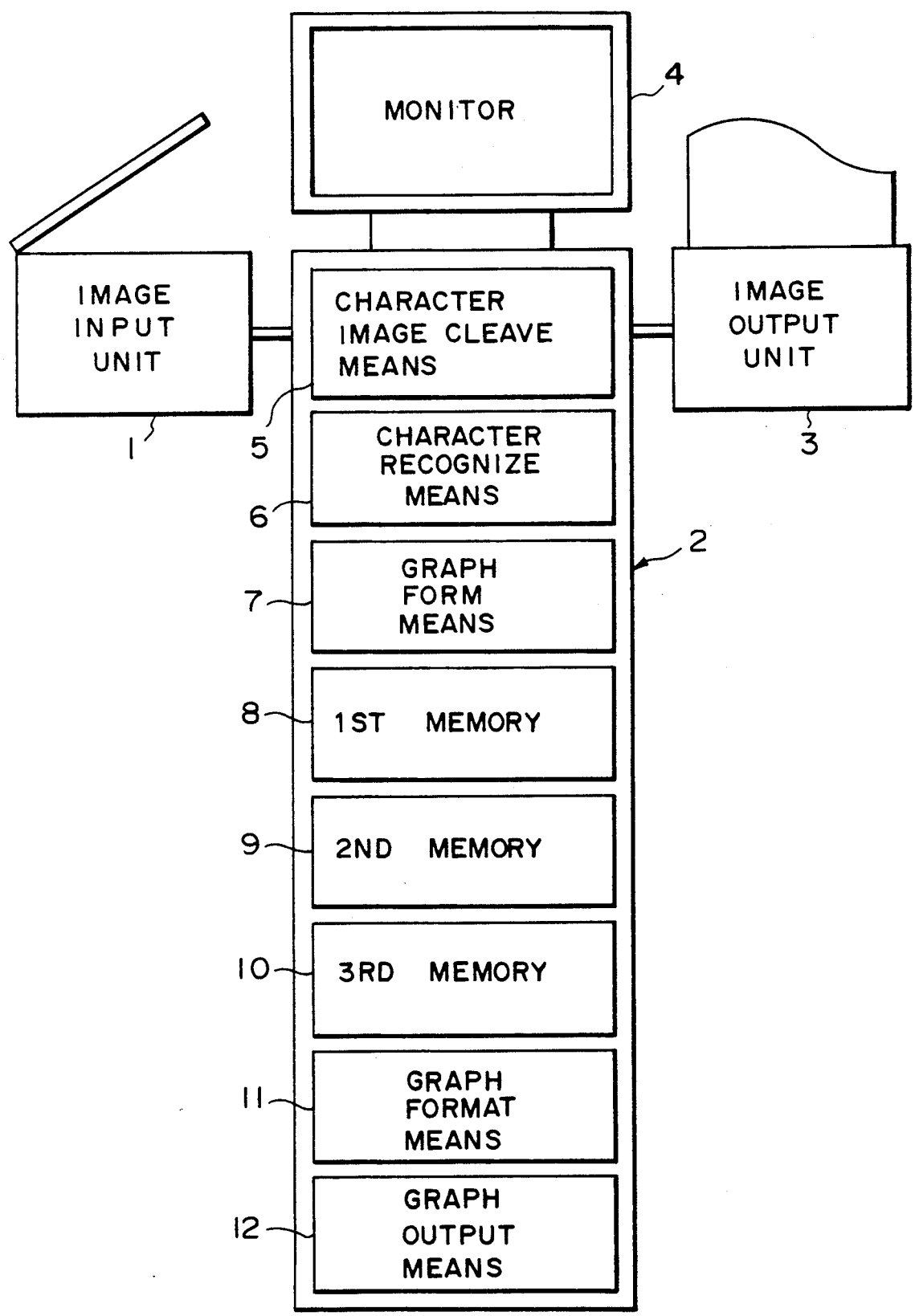
FIG. 1 is a schematic block diagram showing a first embodiment of the image generating apparatus in accordance with the present invention.
Figure 2:
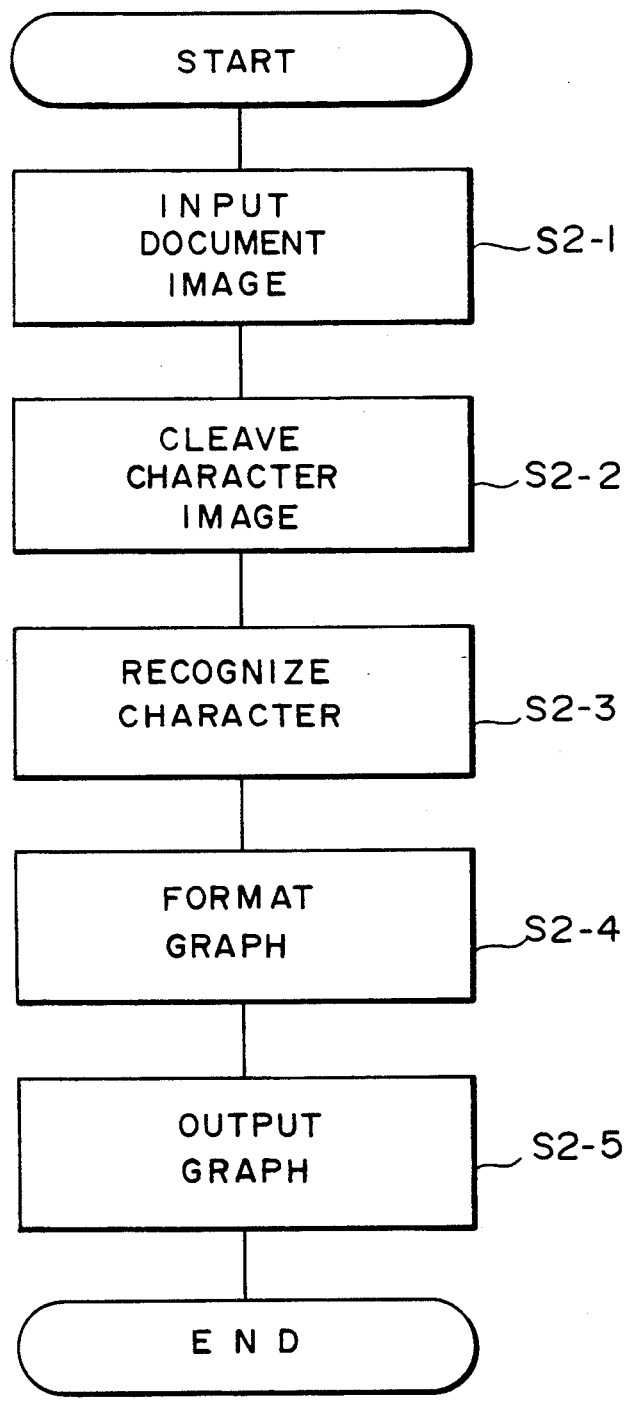
FIG. 2 is a flowchart demonstrating a specific operation of the first embodiment.

Preferred embodiments of the image generating apparatus in accordance with the present invention will be described hereinafter.

First Embodiment

Referring to FIGS. 1 to 4, an image generating apparatus embodying the present invention is shown. As shown, the apparatus comprises a digital scanner or similar image input unit for inputting an image, a computer 2, a display, printer, plotter or similar image output unit 3, and a monitor 4. The computer 2 includes character image cleaving means 5, character recognizing means 6, graph formating means 7, a first memory 8, a second memory 9, a third memory 10, graph drawing means 11, and graph outputting means 12.

Figure 4:
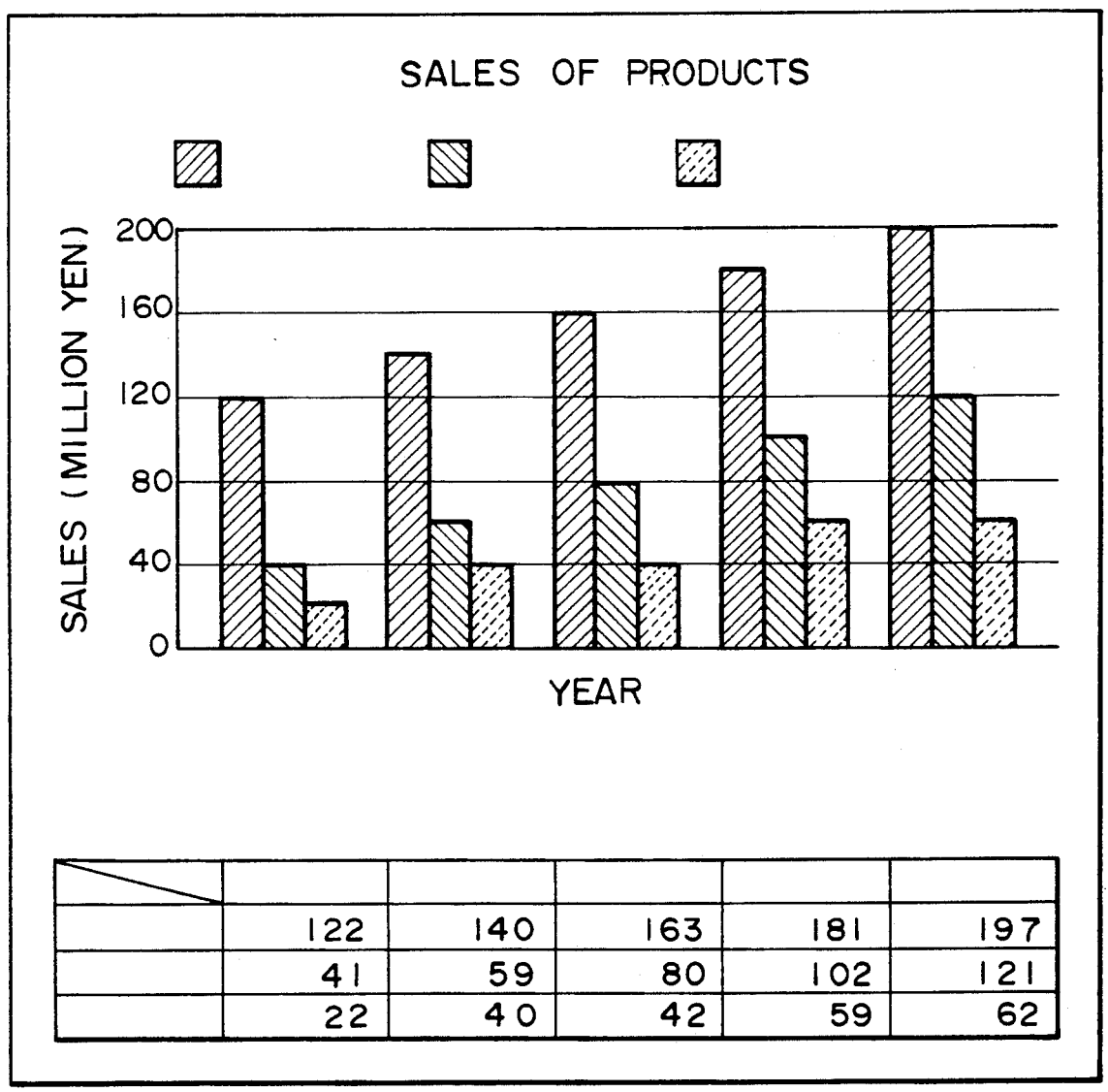
FIG. 4 depicts a graph and a categorized total table which may be printed out by a printing section of the first embodiment.

FIG. 3 shows a specific format of a document applicable to the illustrative embodiment and having frames 21 to 28. After the frames 21 to 28 of the document have been filled up with numerical values associated with a desired graph as well as the title of the graph, the apparatus executes a sequence of steps shown in FIG. 2 for generating an image. The sequence shown in FIG. 2 begins with a step S2-1 wherein the image input unit 1 reads the document to generate image data. In the subsequent step S2-2, the character cleaving means 5 extracts out of the image data the data which are representative of characters and numerals written in the frames 21 to 28 of the document, the extracted data being written in the first memory 8. This is followed by a step S2-3 for sequentially reading the characters and numerals out of the first memory, causing the character recognizing means 6 to recognize them, and then storing the results in the second memory 9. Subsequently, in a step S2-4, the recognized characters and numerals are read out of the second memory 9 and applied to the graph drawing means 11. In response, the graph drawing means formulates a graph such as shown in FIG. 4 in the third memory 10. Finally, in a step S2-5, the graph outputting means 12 delivers the graph having been stored in the third memory 10 to the monitor 4 or the image output unit 3.

The illustrative embodiment constructed and operated as described above has the following advantages.

(1) Once the document shown in FIG. 3 has been inputted in the image input unit 1, the apparatus does not need any manual operations till the end of the graphing procedure. All that is required of a person is filling up the frames of the document.

(2) Since the numerals associated with a graph are written by hand, the apparatus frees one from awkward data inputting manipulations.

(3) The apparatus is easy to handle because one needs only to fill up a predetermined paper sheet, i.e., one does not have to memorize complicated operating procedures.

(4) The apparatus produces a desired graph immediately without being occupied over a long period of time.

Figure 5:
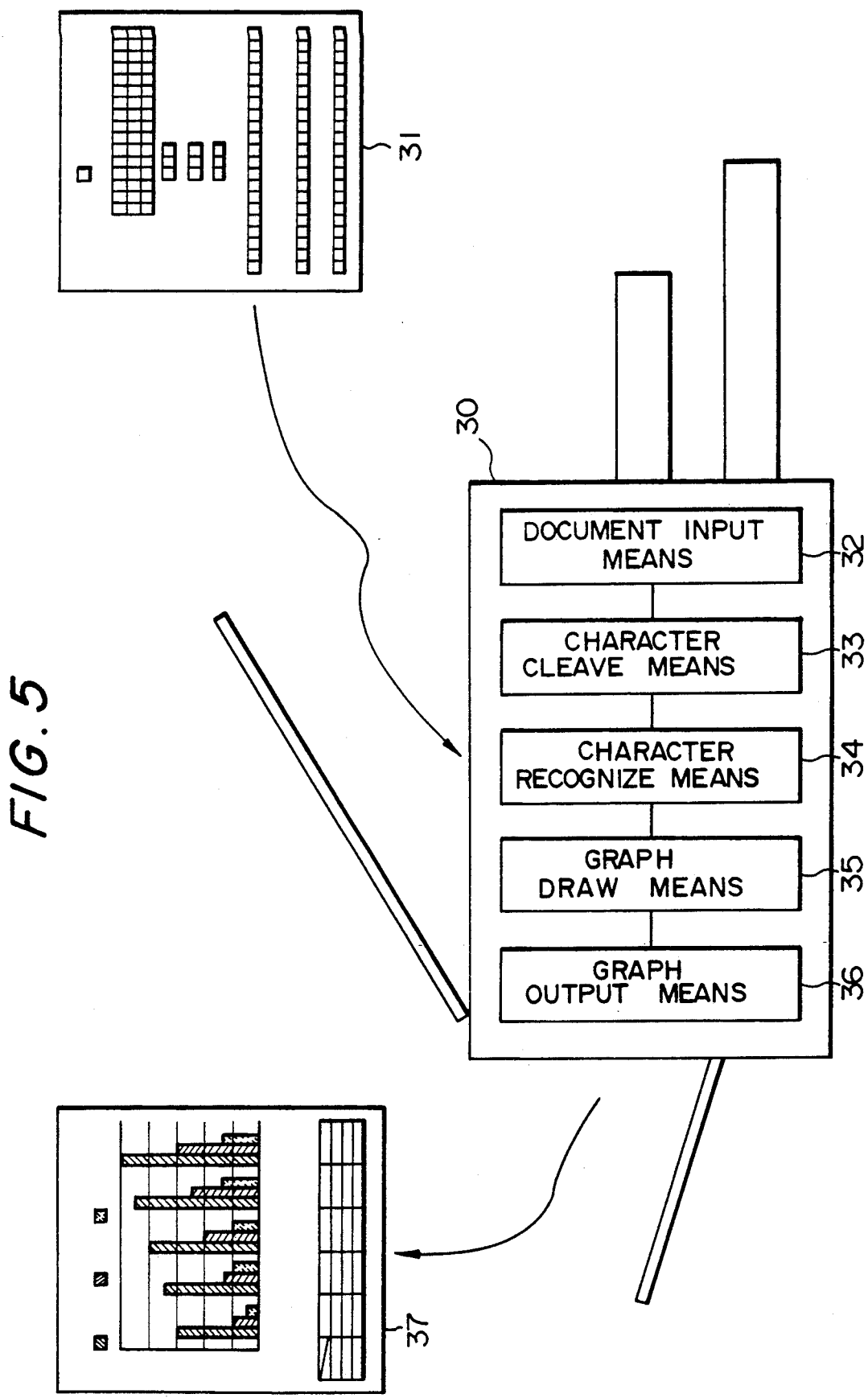
FIG. 5 is a schematic view representative of the application of the present invention to a digital copier.

FIG. 5 shows a digital copier which is implemented by the first embodiment of the present invention described above. The digital copier shown in the figure has an input unit 30 having a glass platen. After a document having a predetermined format and filled up with characters and numerals has been laid on the glass platen, a graph mode is selected and, thereafter, a copy button (not shown) is pressed. In response, document inputting means 32 begins reading the document. Character cleaving means 33 cleaves characters and numerals out of the image which the document inputting means 32 has read, while character recognizing means 34 recognizes them. Graph drawing means 35 develops the resulting data in a memory to formulate a graph, and then graph outputting means 36 prints out the graph on a paper sheet 37. The paper sheet 37 carrying the graph thereon is driven out of the copier. The application of the illustrative embodiment to a digital copier, therefore, allows a graph to be produced by an operation as easy as an ordinary copying operation, establishing a desirable man-machine relationship.

Second Embodiment

Figure 6:
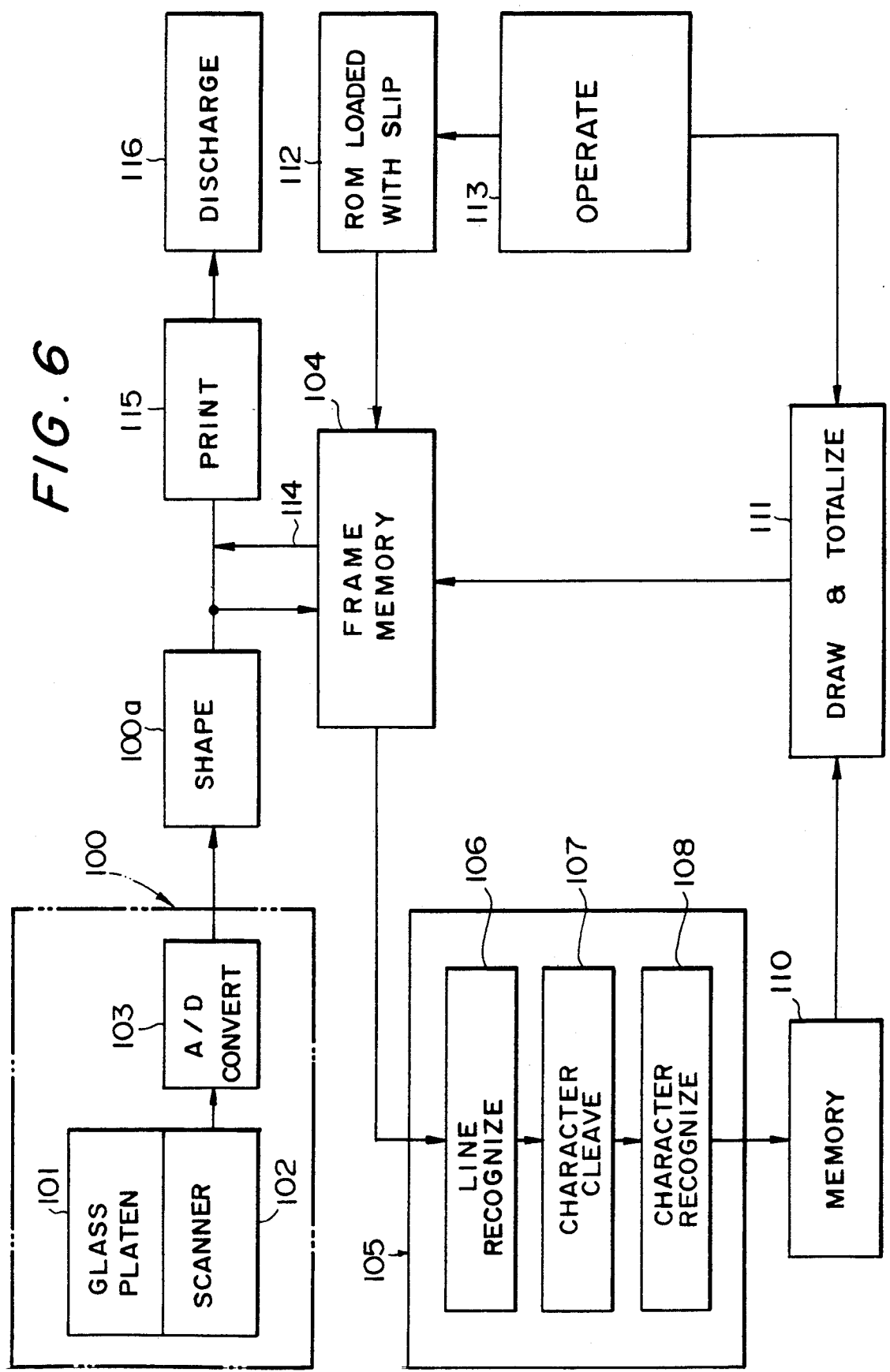
FIG. 6 is a schematic block diagram showing a second embodiment of the present invention.
Figure 7:
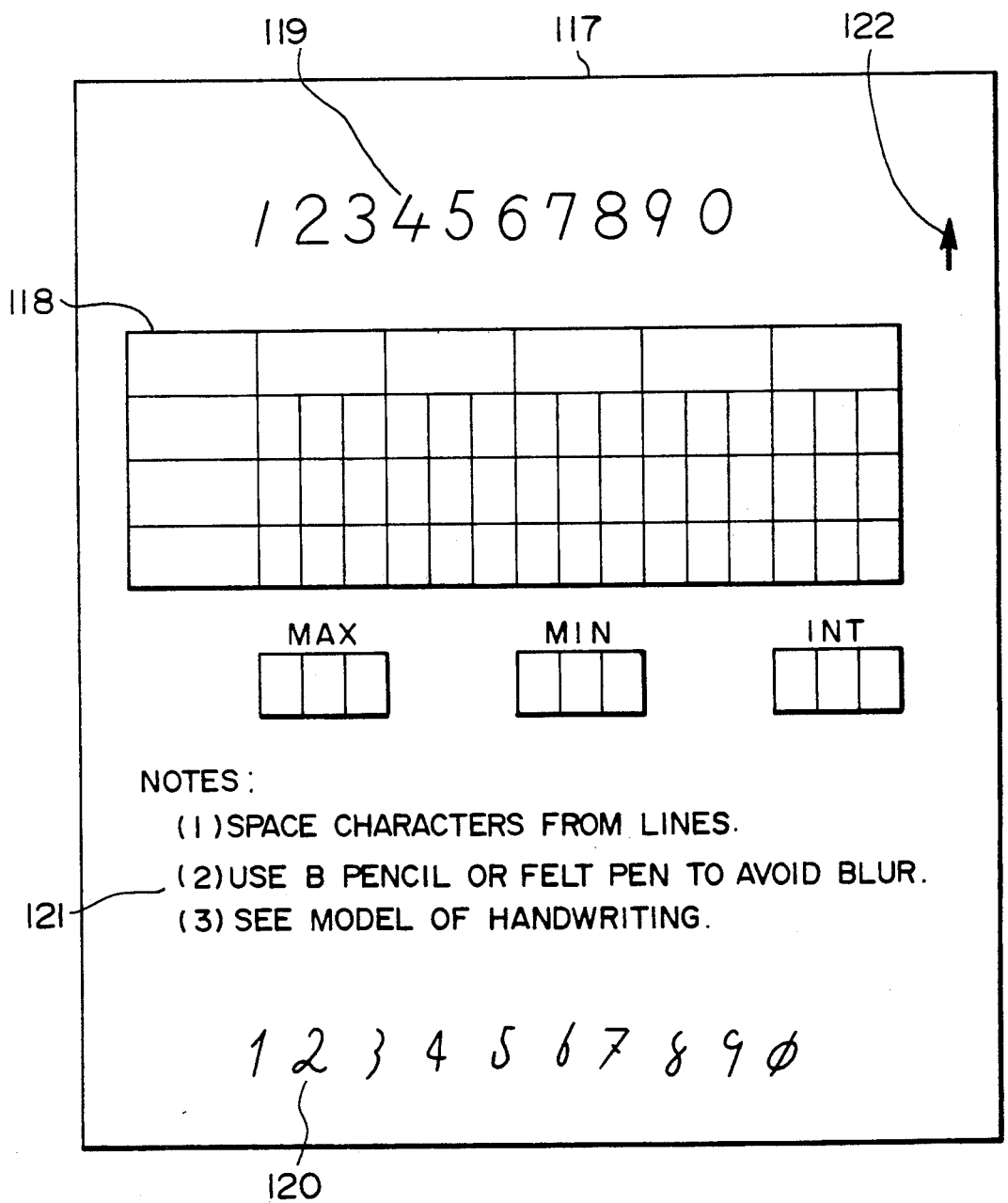
FIG. 7 shows a slip which may be read by the second embodiment.
Figure 8:
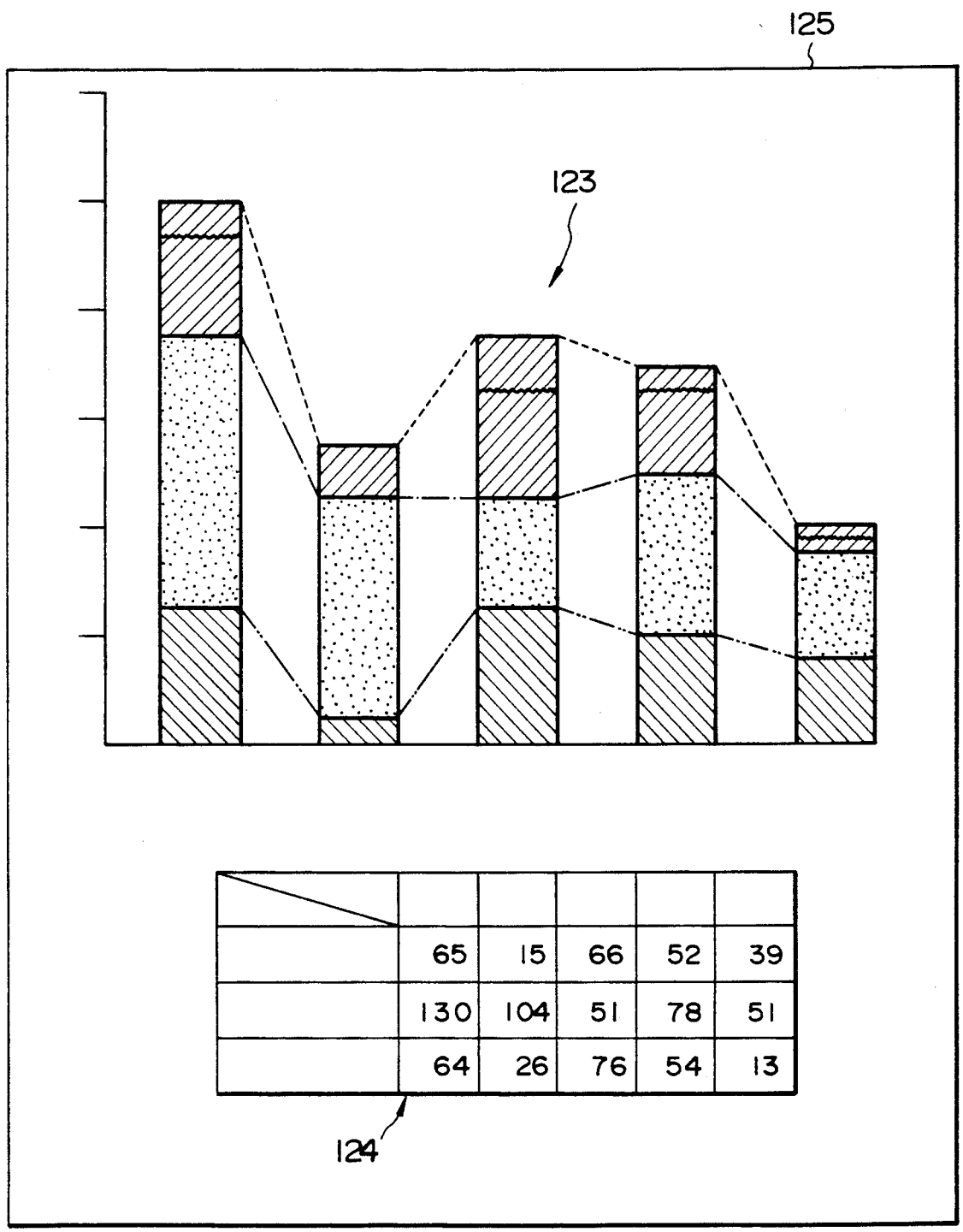
FIG. 8 shows a graph and a categorized total table which may be printed out by a printing section of the second embodiment.

Referring to FIGS. 6 to 8, a second embodiment of the present invention is shown. In this embodiment, a document may be implemented as a slip, as shown in FIG. 7. This embodiment includes a reading section 100 for reading the slip 117 which has been filled up by hand, thereby producing an image signal. Preserving means in the form of a frame memory 104 preserves the image signal. An OCR section 105 serves as recognizing means for recognizing the contents of the slip 117 on the basis of the image signal while outputting the recognized information. A drawing and totalizing section 111 produces image data. A ROM 112 is loaded with the pattern of the slip 117 beforehand. A printing section 115 prints out an image. An operating section 113 is accessible for entering information by hand. The operating section 113 constitutes mode selecting means for selecting either one of an ordinary copy mode and a graph mode, and operating means for commanding the print-out of the slip pattern stored in the ROM 112.

As shown in FIG. 7, the slip 117 is provided with straight lines 118, standard character patterns 119, inhibited character patterns 120, notes 121, and a mark 122 thereon. The straight lines 118 define frames in which characters may be written. The standard character patterns 119 are selected in conformity to a dictionary registered in the OCR section 105 and will be referenced as a model. On the other hand, the inhibited character patterns 120 show poor characters which have to be avoided. After the slip 117 has been filled up according to the notes 121, it will be loaded on the scanner 102 in a particular orientation as indicated by the mark 122.

Referring again to FIG. 6, the reading section 100 has a glass platen 101 to be loaded with the slip 117, a scanner 102 for scanning the slip 117 to convert its contents into an electric signal, and an analog-to-digital (AD) converter 103 for transforming the electric signal into a digital image signal. The output of the AD converter 103 is interconnected to a frame memory 104 via a shaping section 100a. The shaping section 100a processes the digital image signal to reduce the image size and to remove noise, the resulting signal being written in the frame memory 104. The drawing and totalizing section 111 and ROM 112 are also interconnected to the input side of the frame memory 104. The OCR section 105 and printing section 115 are interconnected to the output side of the frame memory 104.

In the OCR section 105, a line recognizing subsection 106 recognizes the lines 118 shown in FIG. 7 on the basis of the image signal which is written in the frame memory 104. A character cleaving subsection 107 draws out the frames defined by the lines 118 one by one in response to information which is fed thereto from the line recognizing subsection 106. A character recognizing subsection 108 recognizes handwritten characters existing in the individual cleaved frames, thereby producing a character signal. When any of the characters existing in the frames, e.g., a numeral is illegible due to poor handwriting or noise, the character recognizing subsection 108 produces a reject signal. When any of the frames is left blank with no characters being written therein, the subsection 108 produces a blank signal. A memory 110 is connected to the output of the character recognizing section 108 in order to store the output information of the section 108, i.e. the character signal, reject signal, and blank signal.

The drawing and totalizing section 111 is interconnected to the output of the memory 110. Although not shown in the figure, this section 111 has an arithmetic operating subsection for performing numerical operations with the recognized information, and a drawing subsection for generating image data representative of a table and a graph which show the results of numerical operations. The image data are fed from the drawing subsection to the printing section 115 via the frame memory 104. FIG. 8 shows a graph 123 and a table 124, for example, which are representative of the result of arithmetic operations as mentioned above and may be printed out on a paper sheet 125 by the printing section 115. The paper sheet 125 carrying such images thereon is driven out of the image generating apparatus through a discharging section 116.

In operation, one fills necessary items of the slip 117 shown in FIG. 7 by hand and then lays it on the glass platen 101. By reading the slip 117, the scanner 102 generates an electric signal and feeds it to the AD converting section 103. The shaping section 100a subjects the resulting digital signal to preprocessing such as reduction and noise removal. The output of the shaping section 100a is written in the frame memory 104. Subsequently, the recognizing subsection of the OCR section 105 recognizes the image signal stored in the frame memory 104 as numerals, while the drawing and totalizing section 111 totalizes the numerals and draws a graph. On the other hand, the frame recognizing subsection 106 of the OCR section 105 recognizes information associated with the arrangement of the frames and included in the image data, e.g. the positions, sizes and inclinations of the lines 118 and the number of frames. Based on such information, the character cleaving section 107 separates character portions and the lines of the individual frames and cleaves characters one by one. The character recognizing subsection 108 recognizes the cleaved characters as numerals and stores the results of recognition in the memory 110.

The drawing and totalizing section 111 calculates, by using the results of recognition stored in the memory 110 and in response to a selection command entered on the operating section 113, the maximum and minimum values and the intervals of a graph, the proportions of individual items to the entire graph, regions to draw, etc. Then, the section 111 produces a graph by assigning a different pattern to each associated region for discrimination purpose. Also, the section 111 totalizes the numerical values by a particular method which is instructed on the operating section 113. The graph and the results of categorized totalization are fed as image data to the frame memory 104 together with the results of recognition which have been stored in the memory 110. The image data are delivered to the frame memory 104 by a path 114 which implements an ordinary digital image generating function, so that the printing section 115 prints them out on the paper sheet 125 shown in FIG. 8. Assume that one has entered a command on the operating section 113 for printing out a format pattern representative of the slip 117. Then, such a format pattern is read out of the ROM 112 and then written in the frame memory 104 as slip pattern data. The slip pattern data is printed out on the paper sheet 125 by the printing section 115 together with the abovementioned graph, results of totalization, and results of recognition.

As described above, this particular embodiment loads the ROM 112 with a pattern of the slip 117 and causes the printing section 115 to print out such a pattern as needed. Hence, numerals handwritten in the slip 117 can be accurately recognized in a uniformized manner at all times. This insures extremely reliable graph drawing and totalizing procedure based on the output of the OCR section 105.

Third Embodiment

Referring to FIGS. 9 to 12, a third embodiment of the present invention is shown. The third embodiment is essentially similar to the second embodiment except for part of the construction and operation which will be described hereinafter. In the figures, the same or similar components are designated by like reference numerals, and redundant description will be avoided for simplicity. The construction of the illustrative embodiment will be described together with its operation.

Figure 9:
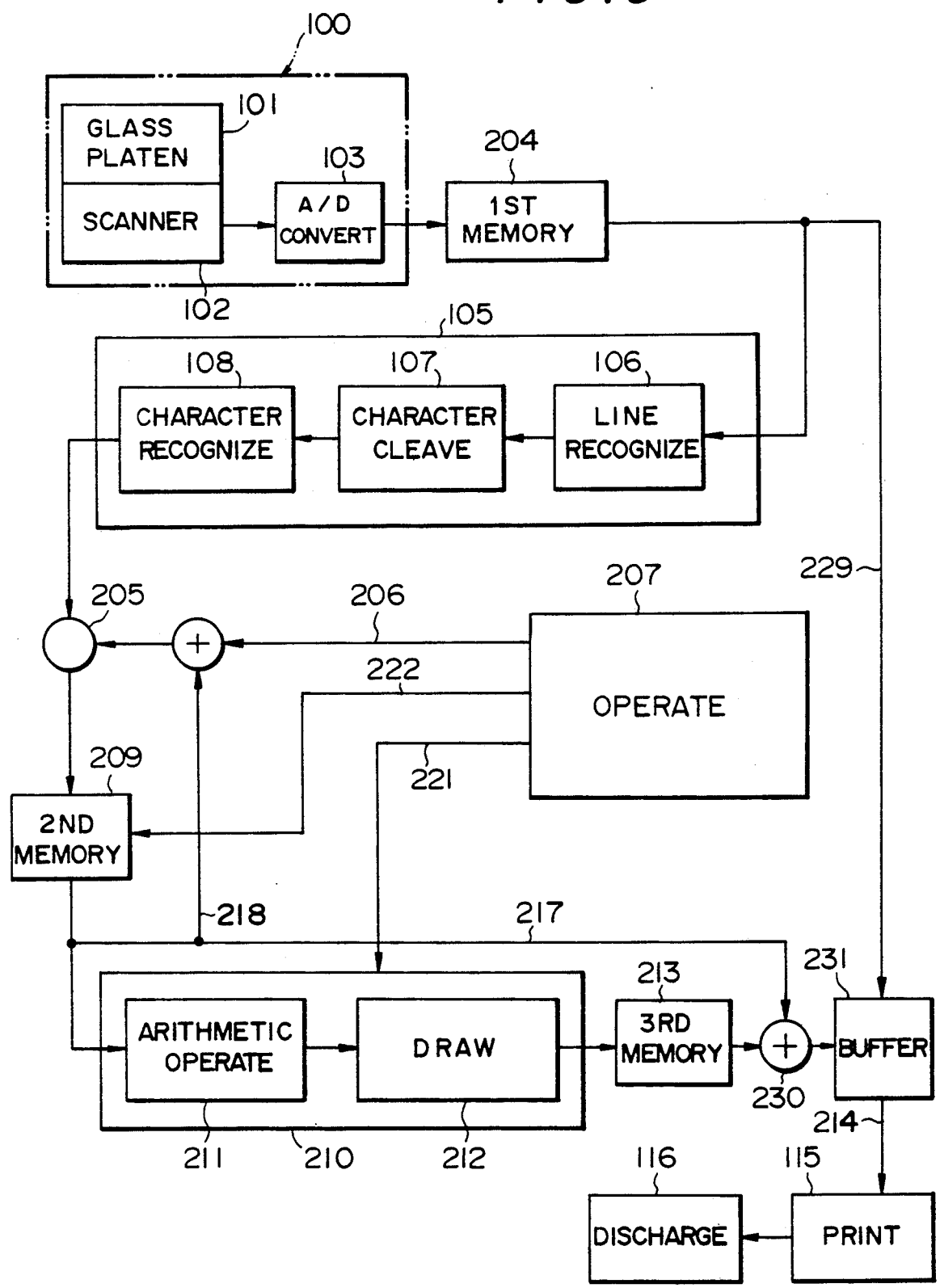
FIG. 9 is a schematic block diagram showing a third
Figure 11:
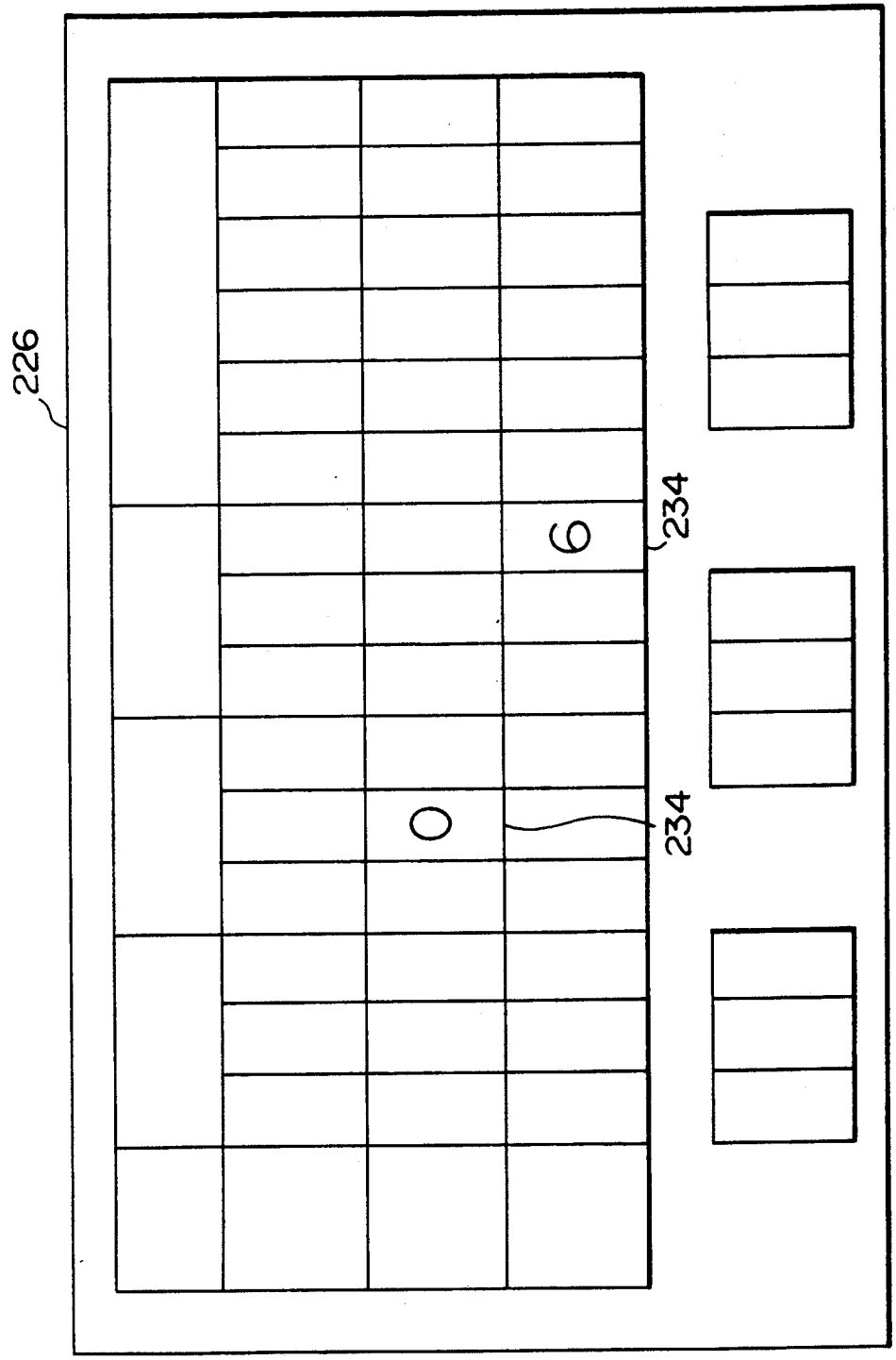
FIG. 11 shows a slip adapted for correction and also usable with the third embodiment.

As shown in FIG. 9, a person fills necessary items of a document 224, FIG. 10, by hand and then lays it on the glass platen 101. By reading the document 224, the scanner 102 generates an electric signal and feeds it to the AD converting section 103. The resulting digital signal is written in a memory 204. The OCR section 105 recognizes the image signal stored in the frame memory 204 as numerals, while a drawing device 210 produces a graph on the basis of the recognized numerals. First, the line recognizing subsection 106 recognizes information associated with the arrangement of the frames and included in the image data, e.g. the positions, sizes and inclinations of the lines 118 and the number of frames. Based on such information, the character cleaving section 107 cleaves characters one by one out of the individual frames. The character recognizing subsection 108 recognizes the cleaved characters as numerals. If any of the handwritten characters in the frames is illegible due to poor shape or noise, for example, the character recognizing subsection 108 produces a result of recognition in the form of a reject symbol 245a, FIG. 12, showing that the character cannot be recognized. If any of the frames is left blank with no characters being written therein such as a frame 244, FIG. 10, the subsection 108 produces a blank symbol indicating that the frame is blank. The result of recognition from the subsection 108 is written in a second memory 209.

The drawing device 210 has an arithmetic operating subsection 211. When the reject signal 245a is absent, the arithmetic operating subsection 211 calculates, by using the results of recognition stored in the second memory 209, the maximum and minimum values and the intervals of a graph selected on an operating section 207, proportions of the individual items to the entire graph, regions to draw, etc. In response to the results of such arithmetic operations, a drawing subsection 212 produces a graph by assigning a different pattern to the associated region of each item for discrimination purpose. The graph produced by the drawing section 212 is written in a third memory 213 as image data. The image data generated by the OCR 105 and drawing device 210 and then stored in the third memory 213 are transferred to the printing section 115 over a path of an ordinary digital image forming apparatus and thereby printed out. By the procedure described so far, the contents handwritten in the document 224 which is laid on the glass platen 101 are outputted in the form of the graph 123, FIG. 8, through the discharging section 116. The result of recognition 124, FIG. 8, produced by the OCR section 105 and stored in the second memory 209 is also printed out on the paper sheet 125.

Assume that a certain numeral has been rejected by the OCR section 105. Then, the drawing device 210 does not execute the image drawing operation, and only the result of recognition by the OCR section 105 is fed to the printing section 115 over a data bus 116 and thereby printed out as recognition result data 124. The result of recognition by the OCR section 105 regarding the graph 123 or the recognition result data 124 and outputted at the discharging section 116 is compared with the numerals actually written in the document or slip 224. Subsequently, a portion where the reject symbol 245a exists and a portion where the recognized character is not correct (misread portion 246a) are corrected by reentry (as represented by a reentered portion 234 shown in FIG. 11). Specifically, when the rejection symbol 245a exists, a correction input mode is automatically set up via the control bus 218. When a misread character is found, the correction input mode is manually set up on the operating section 207 via the control bus 206. Correct characters associated with the rejected portion and misread portion only are written in another slip 226, as represented by the reenentered portions 234 in FIG. 11. The other portions of this slip 226 are simply left blank. Then, the slip 226 for correction is laid on the glass platen 101 and then read by the scanner 102.

In the correction input mode as selected by a mode selecting section 205, the locations of the memory 209 corresponding to those portions of the second or correction slip 226 where a blank symbol has occurred are not rewritten. On the other hand, the locations of the memories 209 corresponding to the portions of the slip 226 where the new characters are recognized are replaced with the new input recognition results. The contents of the second memory 209 corrected as stated are held and, in response to the kind of a desired graph entered on the operating section 207, graphed any desired number of times. The second memory 209 is initialized as commanded on the operating section 207 via a control bus 222. The OCR section 105 and drawing device 210 have a recognizing and a drawing function which are independent of an ordinary digital image generating function. Hence, while the OCR section 105 and drawing device 210 are operated, ordinary digital image generating processing can be executed in parallel via a data/address bus 229. In such a case, a buffer 231 serves to prevent the data/address bus 229 from conflicting with an adding section 230 as to the propagation of data.

In FIG. 10, the reference numeral 233 designates numerals which are written by hand.

The illustrative embodiment allows handwritten numerical data to be presented in a graph which is easy to see by intuition. Since some different kinds of graphs are available with this embodiment, it is possible to present the numerical data in an optimal format in matching relation to the contents and nature thereof. The numerical data are printed out together with a graph, i.e., one can see objective data together with an intuition-oriented image. Such concrete presentation of numerical data is achieved simply by writing them by hand, so that any one can graph necessary data with ease. Furthermore, the exclusive recognition and graphing procedure can be executed independently of an ordinary digital image generating procedure, whereby efficient office work is promoted.

Fourth Embodiment

Referring to FIGS. 13 to 19, a fourth embodiment of the present invention is shown. This alternative embodiment is essentially the same as the third embodiment except for part of the construction and operation which will be described. In the figures, the same or similar components are designated by like reference numerals, and redundant description will be avoided for simplicity.

Figure 13:
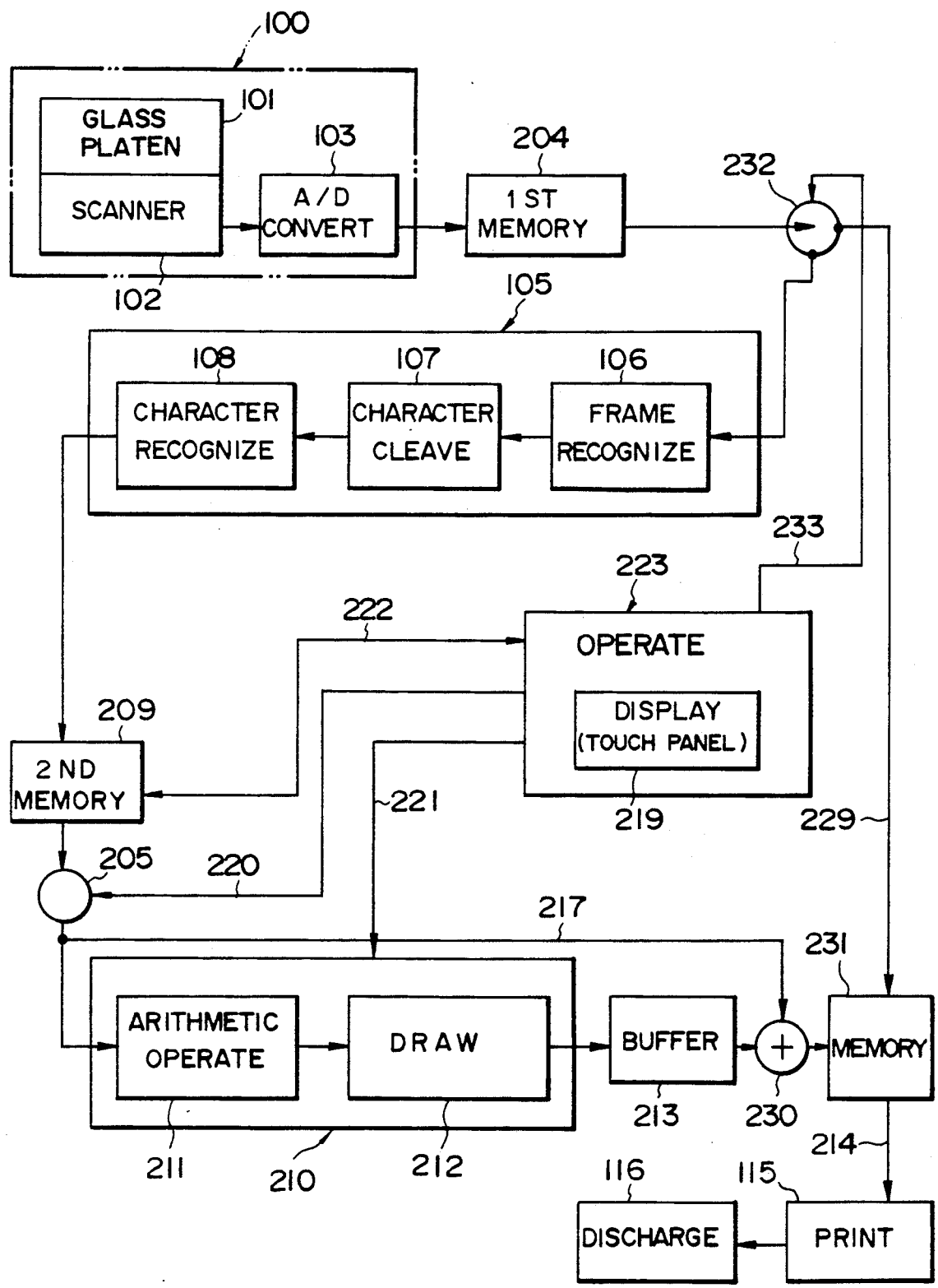
FIG. 13 is a schematic block diagram showing a fourth embodiment of the present invention.
Figure 14:
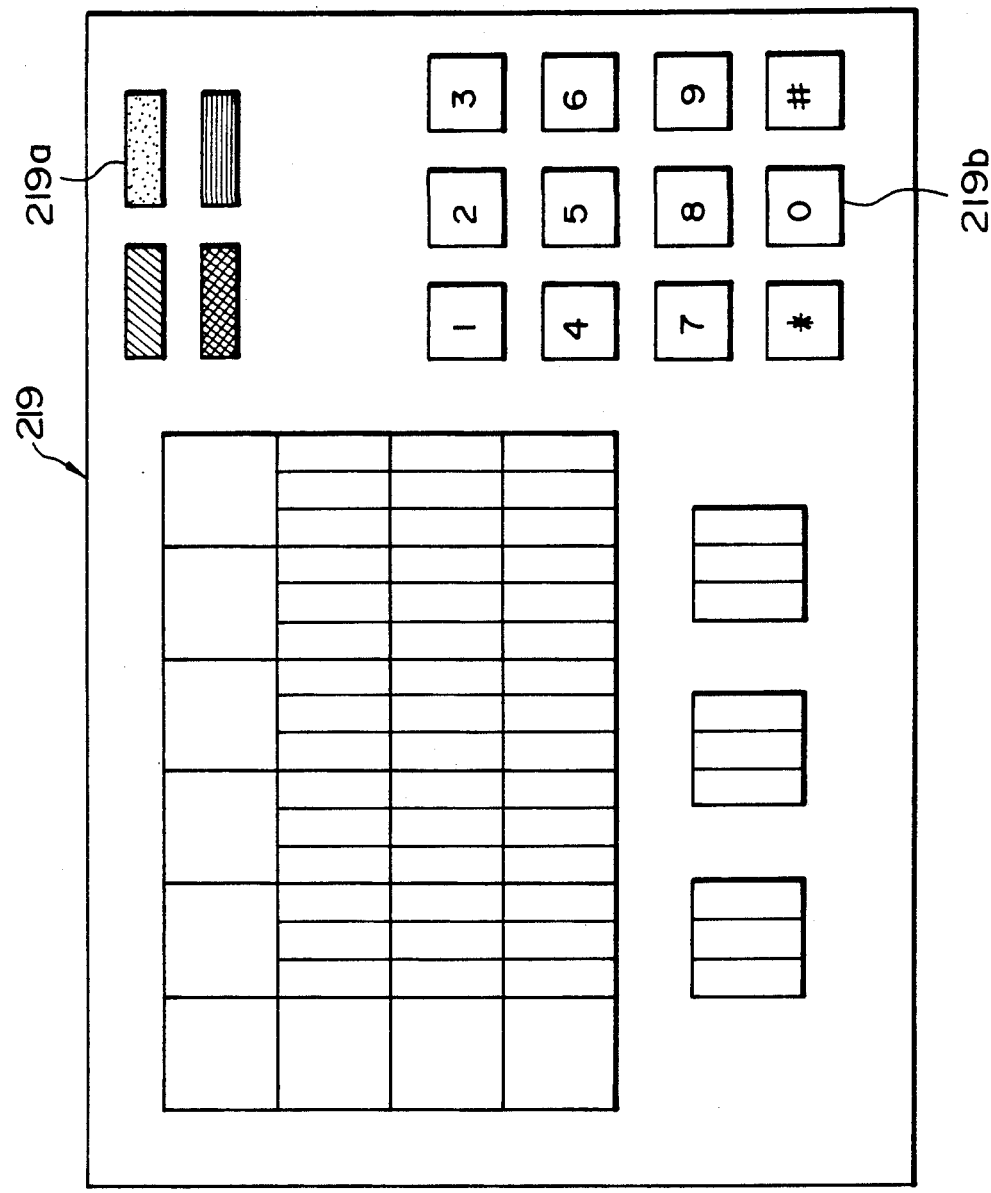
FIG. 14 shows an operating section and display section included in the fourth embodiment.

As shown in FIG. 13, the fourth embodiment has a switching section 232 which is interconnected to an operating section 223 by a signal line 233 in order to switch over the data propagation path from the first memory 204. The operating section 223 is interconnected to the second memory 209 by the control bus 222. A display such as a touch panel 219 shown in FIG. 14 is included in the operating section 223 for displaying recognized information optically. Recognized information appears on the touch panel 219 in the same format as the slip 224, FIG. 10, which is read by the reading section 100. The display positions on the touch panel 219 are individually associated with the addresses of the second memory 209 where recognized information is to be stored. The operating section 223 and data bus 222 in combination constitute correcting means for entering correction data in the second memory 209. Specifically, when the operator touches a desired frame and a desired character or characters on the touch panel 219 to enter correction data, the correction data are fed to corresponding addresses of the second memory 209 via the data bus 222 so as to replace the recognized information having been stored therein. A control bus 220 interconnects the operating section 223 and mode selecting section 205. When a draw command is entered on the operating section 223, it is delivered to the mode selecting section 205 via the control bus 220 resulting in the recognized information being read out of the second memory 209 and fed to the drawing section 210 and so forth.

The operating section 223 and the control bus 221 extending between the operating section 223 and the drawing section 210 serve as selecting means which is available for entering a select command indicative of the kind of a desired graph and meant for the drawing section 210. In response to the select command, the drawing section 210 determines the maximum and minimum values and the intervals of a graph, the proportions of the individual items to the entire graph, regions to draw, drawing patterns, etc. The operating section 223, switching section 232, a signal line 233 interconnecting the operating section 223 and switching section 232, and a data/address bus 229 interconnecting the switching section 232 and a buffer 231 constitute interrupting means which allows an image signal from the reading section 100 to be selectively transferred to the printing section 115. A graph mode and an ordinary copy mode are switched over by entering a command on the operating section 223 which is destined to the mode selecting section 205.

Figure 15:
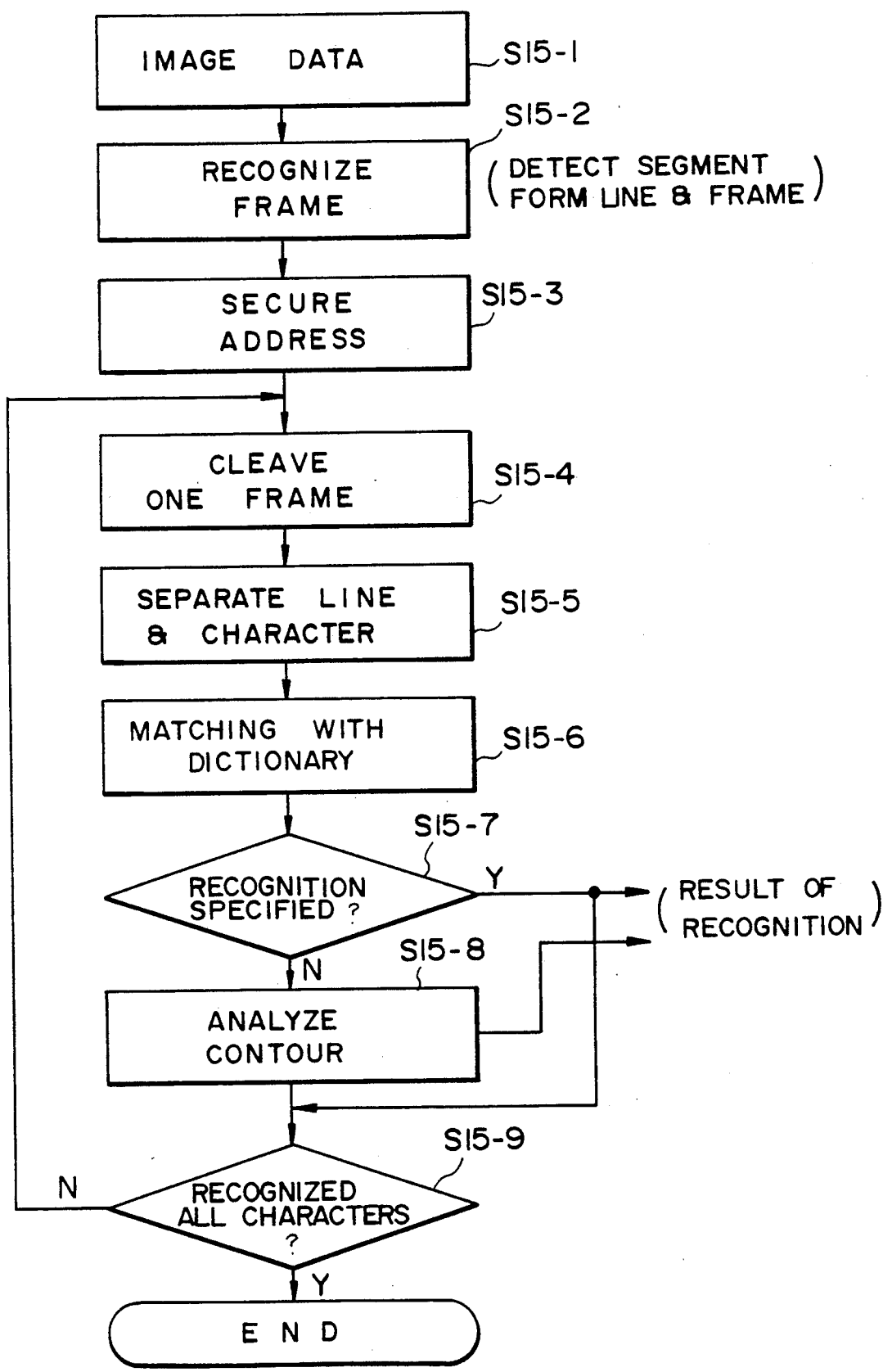
FIG. 15 is a flowchart demonstrating a specific operation of a recognizing section also included in the fourth embodiment.

In the fourth embodiment, as in the third embodiment of FIG. 9, the OCR section 105 recognizes an image signal and produces recognized information as shown in a flowchart in FIG. 15. Specifically, the slip 224 shown in FIG. 10 is laid on the glass platen 101 and then scanned by the scanner 102, whereby the contents of the slip 224 are transformed into an electric signal. The AD converter 103 converts the electric signal into a digital image signal. This image signal is written in the first memory 204 and applied to the OCR section 105 via the switching section 232. The procedure described so far is represented by a step S15-1. This is followed by a step S15-2 for causing the line recognizing section 106 to separate segment components out of the image signal. If the distance between nearby segment components is smaller than a predetermined number of dots, the segment components are interconnected to form a segment of a line. If the distance between a separated segment and a segment adjacent thereto is smaller than a predetermined threshold, they are interconnected to form a frame; if the resulting frame is smaller than a predetermined threshold as to size, it is not recognized as a frame. In this manner, based on the image signal stored in the first memory 204, there are recognized and extracted the positions, thicknesses and inclinations of the lines 225 on the slip 224 of FIG. 10, the number of frames 242 defined by the lines 225, etc.

In the next step S15-3, different addresses of the memory are allocated to the individual frames 242 which are different in vertical and horizontal positions from each other, on the basis of the above-stated information. Then, the character cleaving section 107 cleaves information associated with the multiple frames 242 frame by frame, i.e., it separates the individual frames 242 from one another (step S15-4). Subsequently, vertical and horizontal projections are produced by using the information associated with the individual frames 242, and the portions corresponding to the lines 225 and the portions corresponding to the handwritten characters 243, for example, are distinguished from each other (step S15-5). The character recognizing section 108 compares the separated hand-written characters such as the characters 243 with a dictionary (step S15-6). At the same time, the character recognizing section specifies the handwritten characters and produces signals representative of such characters (step S15-7). If the section 108 cannot specify any of such characters, it analyzes the contour of the character (step S15-8). If the character is illegible due to poor handwriting or noise as determined by the analysis, the section 108 produces a reject signal. If any of the frames 242 is left blank with no characters being written therein (blank portion 244 shown in FIG. 10), the section 108 produces a blank signal. By the same procedure, all the characters on the slip 224 are recognized (step S15-9).

The contents of the recognized information produced by the above procedure S15-1 to S15-9 are individually stored in predetermined addresses of the second memory 209. More specifically, designating means sequentially designates the leading addresses of the locations of the second memory 209 in association with the positions on the slip 224, so that the recognized information may be sequentially written in the memory 209 from the leading addresses. At the same time, the recognized information is fed to the touch panel 219 of the operating section 223 via the data bus 222. The positions on the touch panel 219 corresponding to the locations in the memory 209 are determined to display the recognized information thereon, i.e., the recognized information is displayed on the touch panel 219 in the same format as on the slip 224. The touch panel 219 displays the optical characters 243a of FIG. 12 in matching relation to the handwritten characters 243 of the slip 224, displays the blank portions 244 of the slip 244 as blanks 244a, and displays the reject symbol 245a if any of the characters 245 on the slip 224 is illegible.

Figure 16:
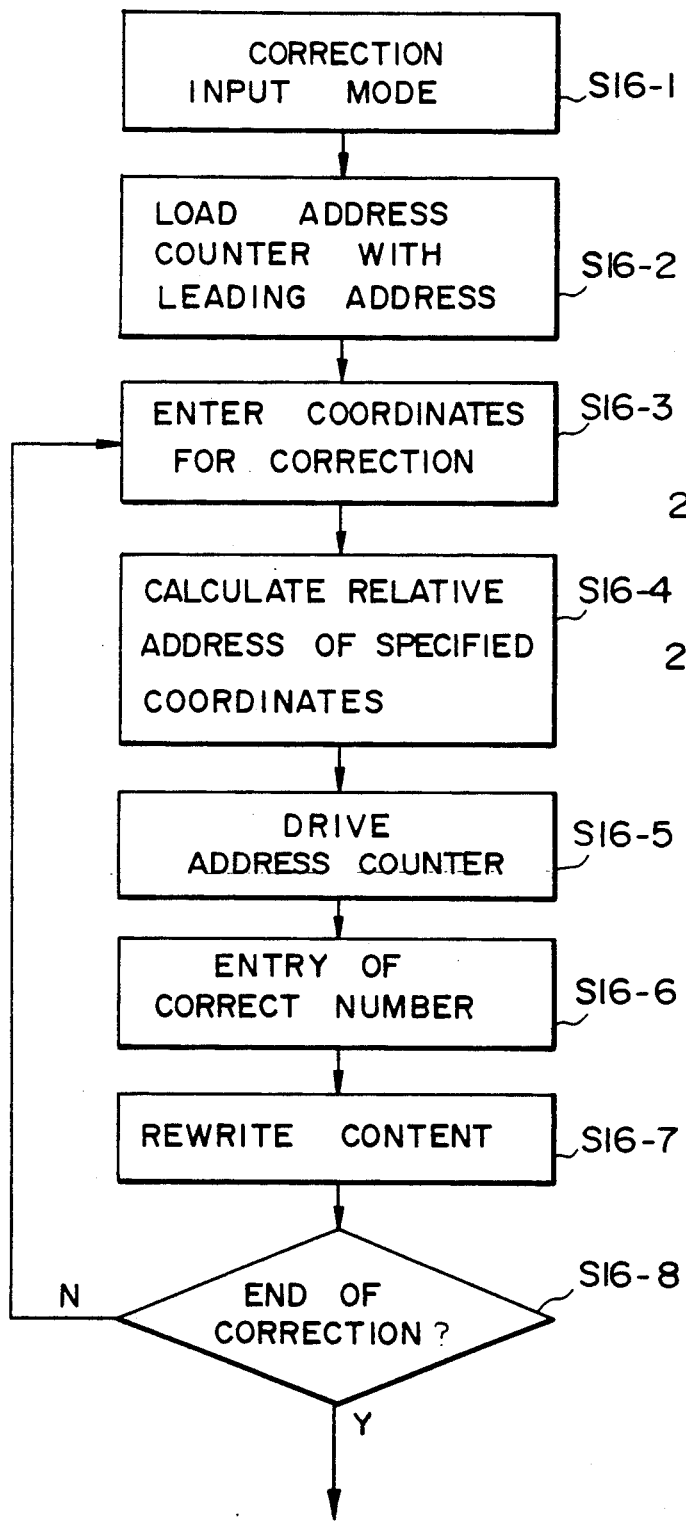
FIG. 16 is a flowchart representative of a procedure for correcting recognized information.

FIG. 16 shows a sequence of steps for correcting any of the recognized information appearing on the touch panel 219. Specifically, the operator compares the recognized information appearing on the touch panel 219 shown in FIG. 14 with the contents of the slip 224 shown in FIG. 10. Assume that the operator finds that the character 246 on the slip 224 has been misread as the character 246a of FIG. 12 or that the character 245 has been replaced with the reject symbol 245a, for example. Then, the operator touches an input command area 219a provided on the touch panel 21 so as to set up the correction input mode (step S16-1). In response, an address counter 250, FIG. 17, indicates a leading address 251 associated with the recognized result (step S16-2). Subsequently, the operator touches the particular portion of the touch panel 219 where the misread or rejected character is positioned, enters coordinates for correctionm and thereby designates the frame to correct (step S16-3). As a result, a relative address of the coordinates is calculated (step S16-4) to load the address counter 250 with the designated address 252 instead of the leading address 251 252 (step S16-5). In this condition, the operator touches a numerical input section 219b on the touch panel 219 to enter a correct numerical value (step S16-6). In response, the recognized information 253 located at the address 252 is rewritten (step S16-7). By the same procedure, all the illegible characters and rejected characters are corrected (step S16-8).

Figure 18:
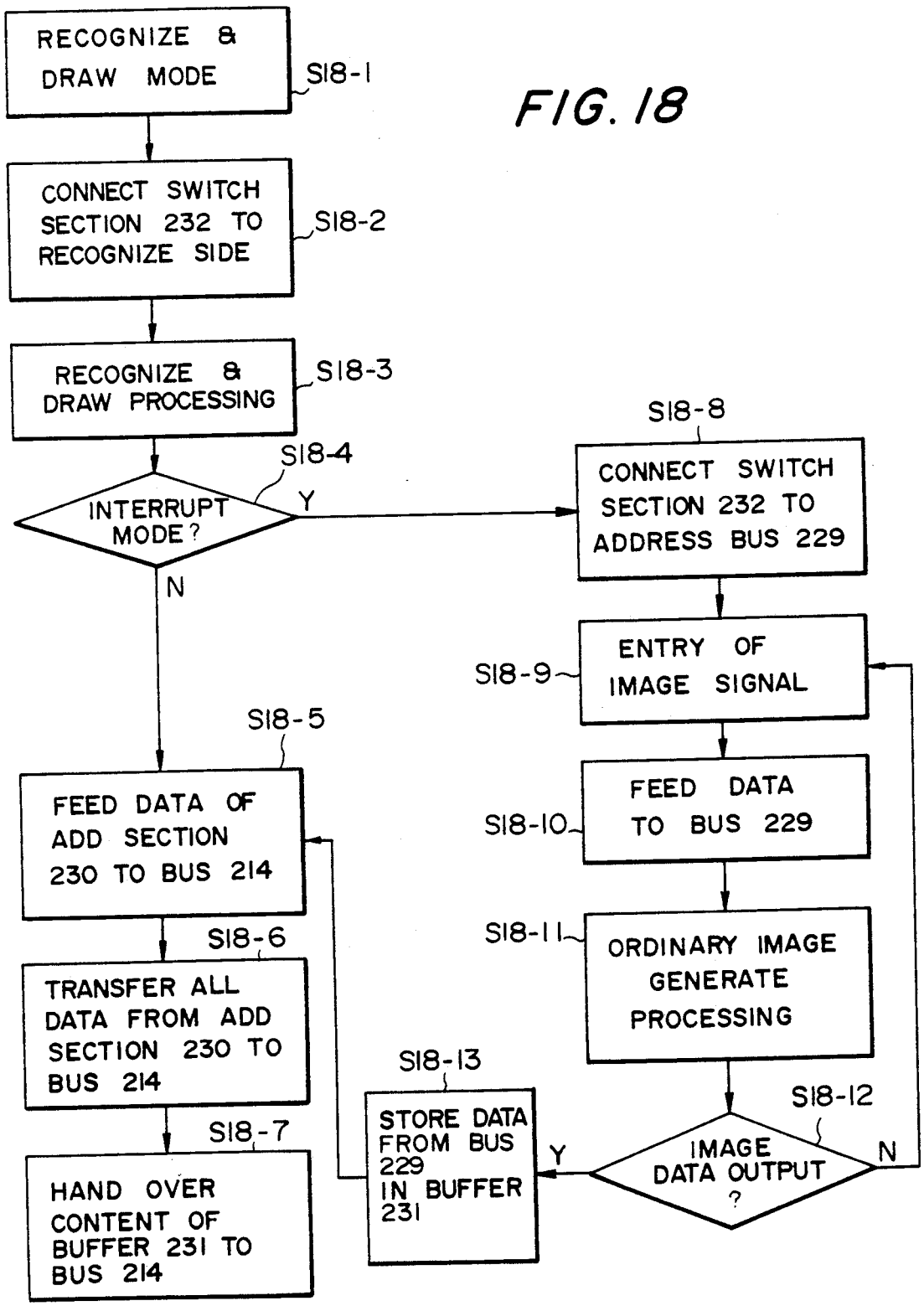
FIG. 18 is a flowchart demonstrating interrupt processing.

FIG. 18 indicates an interrupt procedure for transferring the image signal from the reading section 100 to the printing section 115 via the data/address bus which interconnects the switching section 232 and buffer 231. For this procedure, the operating section 232 is manipulated to set up a recognize and draw mode, i.e., a graph mode (step S18-1). Specifically, the switching section 232 is operated to connect the information delivery path to the OCR section 105 (step S18-2). On the delivery of the image signal to the OCR section 105 via the switching section 232, recognizing and drawing processing is executed (step S18-3), and then whether or not an interrupt mode has been set up is determined (step S18-4). If the answer of the step S18-4 is NO, all the information propagating through the adding section 230 such as the image data are routed to the path 214 (step S18-5), the information fed from the third memory 213 via the adding section 230 as well as other information routed through the adding section are transferred to the path 214 (step S18-6), and the information temporarily stored in the buffer 231 is also delivered to the path 214 (step S18-7). In response to these information, the printing section 115 prints out the image.

On the other hand, if the answer of the step S18-4 is YES, the switching section 232 switches the information delivery path into connection with the data/address bus 229 (step S18-8). Thereupon, the image signal is inputted via the switching section 232 (step S18-9), the image signal is fed from the buffer 231 to the printing section 115 via the data/address bus 229 (step S18-10), and the printing section 115 prints out the image based on the image signal from the reading section 100, i.e., performs an ordinary printing operation (step S18-11). Subsequently, whether or not the image data have been formatted and propagated through the adding section 230 is determined (step S18-12). If the answer of the step S18-12 is YES, the image signal propagated through the data/address bus 229 is stored in the buffer 231 (step S18-13). This is followed by the steps S18-5 and S18-6 stated earlier. Finally, the image signal stored in the buffer 231 is also delivered to the printing section 115 via the path 214 to be printed out (step S18-7). If the answer of the step S18-12 is NO, the program returns to the step S18-9.

The illustrative embodiment has various advantages, as enumerated below.

(1) The OCR section 105 recognizes the contents of the slip 224 shown in FIG. 10, while the arithmetic operating section 211 performs numerical operations by using the recognized contents. The drawing section 212 produces image data for graphing the results of the numerical operations and feeds them to the printing section 5. In response, the printing section 5 prints out the contents of the slip 224 as a graph 123, for example, as shown in FIG. 8. Any person can, therefore, readily graph desired numerical data simply by writing them in the slip 242 or similar document.

(2) The kind of a graph is selectable by entering a select command on the operating section 223. Hence, numerical data can be presented in an optimal format matching the contents and nature of numerical data, further facilitating intuitive recognition of the numerical data. Since the recognized information is written in the second memory 209, they can be read out and outputted as various kinds of graphs and any desired number of times. The categorized total table 124 shown in FIG. 8 is outputted together with the graph 123, so that one can see the objective data in addition to the intuition-oriented data.

(3) While the drawing section 210 is operated to perform arithmetic operations and generate image data, the operating section 223 may be manipulated to set up an interrupt mode in which interrupting means allows ordinary image generating processing to be executed in parallel. This is successful in increasing the efficiency of clerical work. When image data are fed from the drawing section 210, the image signal propagated through the data/address bus 229 is temporarily lodged in the buffer 231. Hence, data belonging to two different systems are prevented from conflicting with each other.

(4) Since the recognized information from the OCR section 105 are displayed on the touch panel 219, one can examine them immediately. Further, one can readily compare the recognized information appearing on the touch panel 219 with the contents of the slip 224 because the former is displayed in the same format as the latter. When any of the recognized data appearing on the touch panel 219 is not correct, the operator can correct it easily and rapidly by touching a particular area and character on the panel 219.

Fifth Embodiment

Figure 20:
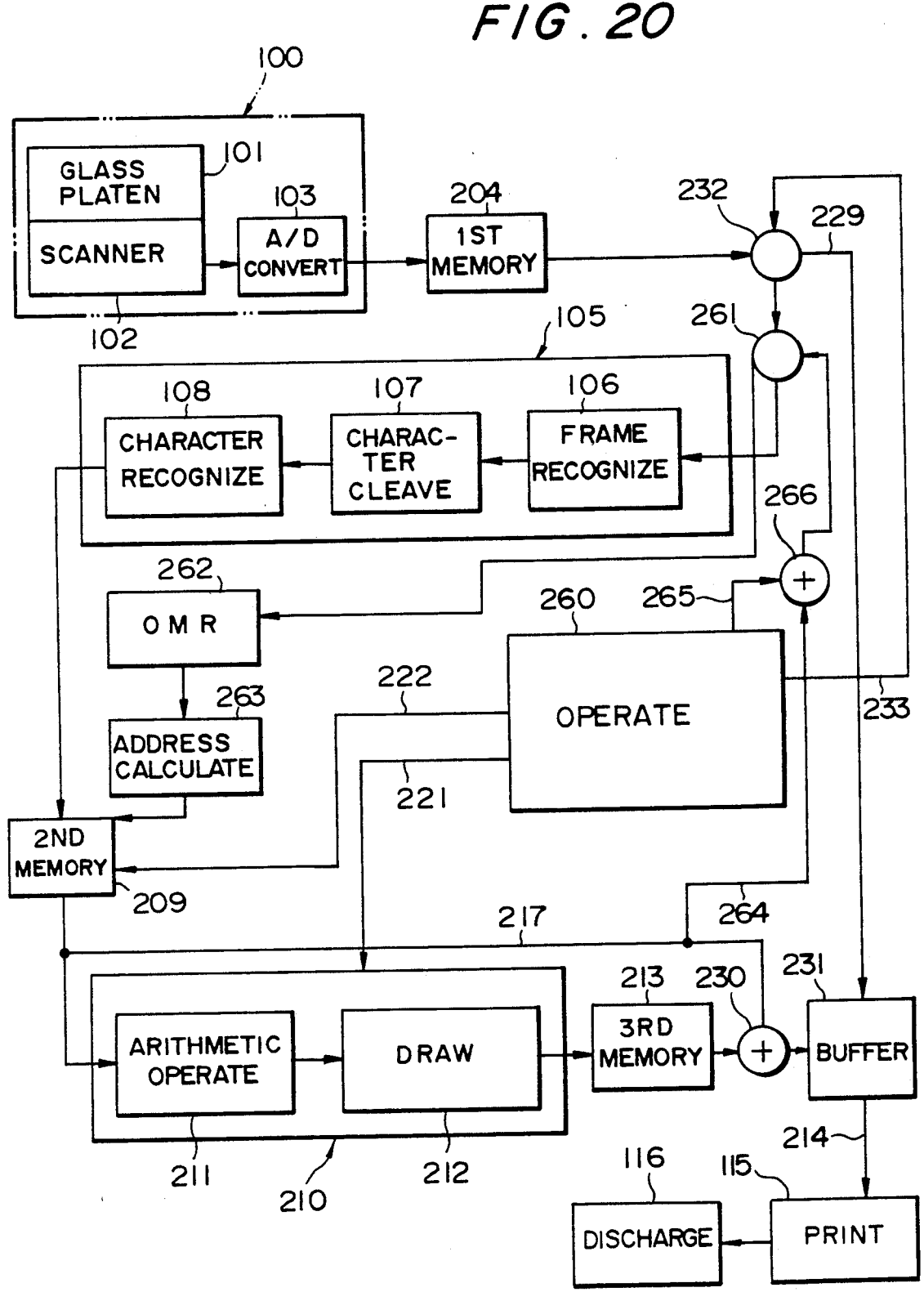
FIG. 20 is a schematic block diagram showing a fifth embodiment of the present invention.
Figure 22:
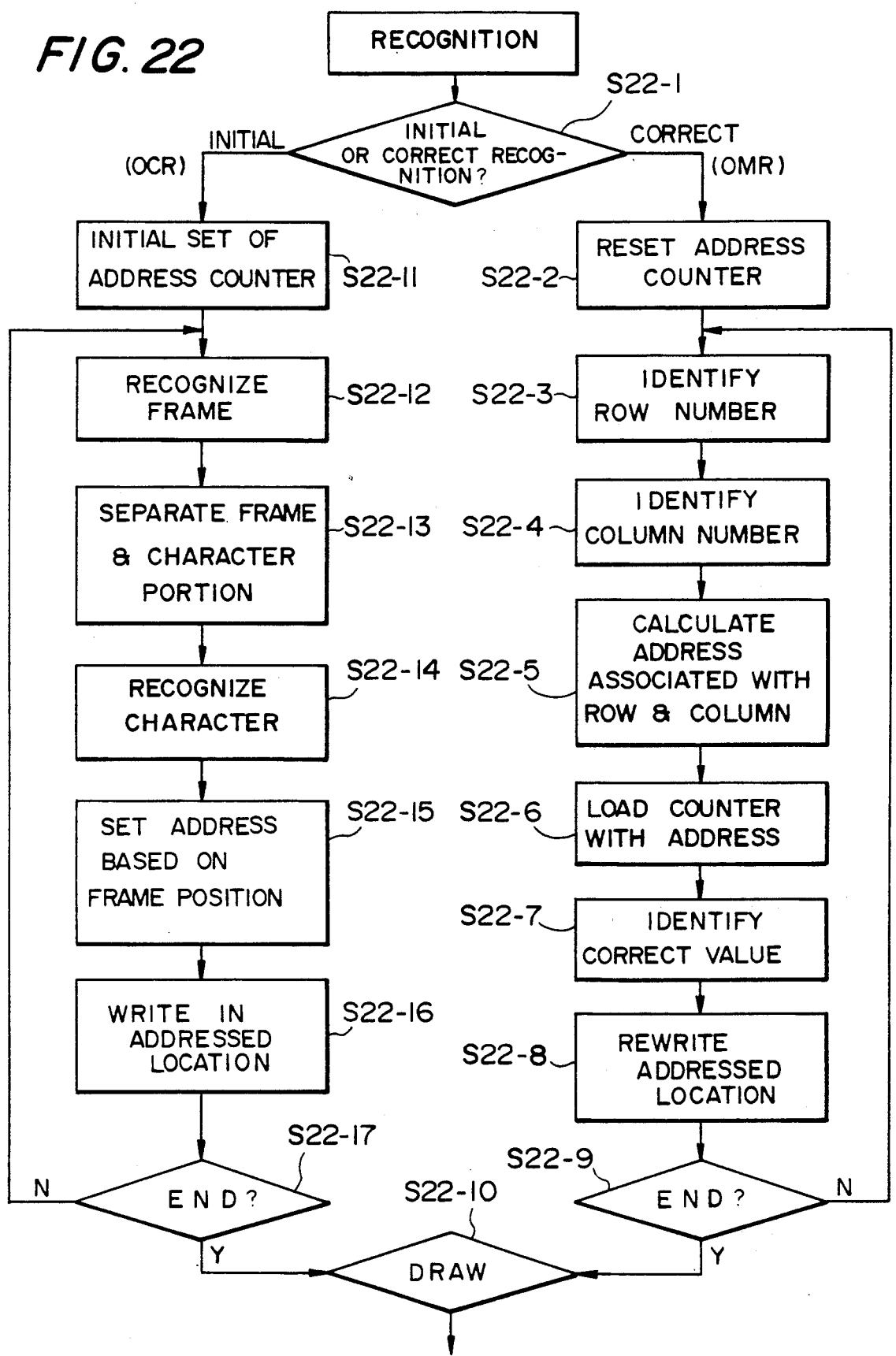
FIG. 22 is a flowchart representative of specific operations of recognizing means and mark identifying means included in the fifth embodiment.

Referring to FIGS. 20 to 22, a fifth embodiment of the present invention is shown. This embodiment is essentially similar to the fourth embodiment except for part of the construction and operation which will be described. In the figures, the same or similar components will be designated by like reference numerals, and redundant description will be avoided for simplicity.

As shown in FIG. 20, a switching section 261 is disposed between the output of the switching section 232 and the input of the OCR 105. The output of the switching section 261 is selectively caused into connection with the OCR section 105 and mark reading means in the form of an optical mark reading (OMR) section 262. FIG. 21 shows a document for correction such as a mark sheet 270 applicable to the illustrative embodiment. Specifically, the OMR section 262 reads, on the basis of the image signal fed thereto via the switching section 261, marked frames 271 of the mark sheet 271 and enters correction data for correcting recognized information. The second memory 209 is interconnected to the output of the OMR section 262 via an address calculating section 263. The address calculating section 263 determines an address of the memory 209 where the recognized information associated with the correction data is stored. The data bus 217 and drawing section 210 are interconnected to the output of the memory 209, as in the fourth embodiment. A bus 264 is connected at one end to the data bus 217 and at the other end to the input of an adding section 266 together with a bus 265 which extends from the operating section 260. The output of the adding section 266 is interconnected to the switching section 261. The operating section 260, buses 264 and 265, adding section 266 and switching section 261 constitute switching means for switching the information delivery path from the first memory 204 between the OCR section 105 and the OMR section 262.

This embodiment lacks the touch panel or display 219, adding section 218 and control bus 220 which are included in the fourth embodiment.

In the illustrative embodiment, the OCR section 105 recognizes an image signal and outputs recognized information in the same manner as in the fourth embodiment, i.e., according to the procedure shown in FIG. 15. Such a procedure, therefore, will not be described to avoid redundancy.

The recognized information produced by the steps S15-1 to S15-9 of FIG. 15 are stored in predetermined addresses of the second memory 209, as in the fourth embodiment. Specifically, the leading addresses of the memory 209 to be assigned to the recognized information are specified in correspondence with the positions on the slip 224 shown in FIG. 10, so that information may be sequentially stored from the leading addresses. The contents of the recognized information are outputted by ordinary outputting means. Specifically, the printing section 115 prints out the recognition result table 241, FIG. 12, in the same format as the slip 224, FIG. 10. The recognition result table 241 shows characters 243a of FIG. 12 which match the handwritten characters 243 of the slip 224 of FIG. 10, shows blanks 244a which match the blank portions 244 of the slip 224, and shows a reject symbol 245a when any of the characters 245 of the slip 224 is illegible. The results of recognition by the OCR section 105 stored in the second memory 209 are corrected in exactly the same manner as has been described with reference to FIG. 16.

Figure 17:
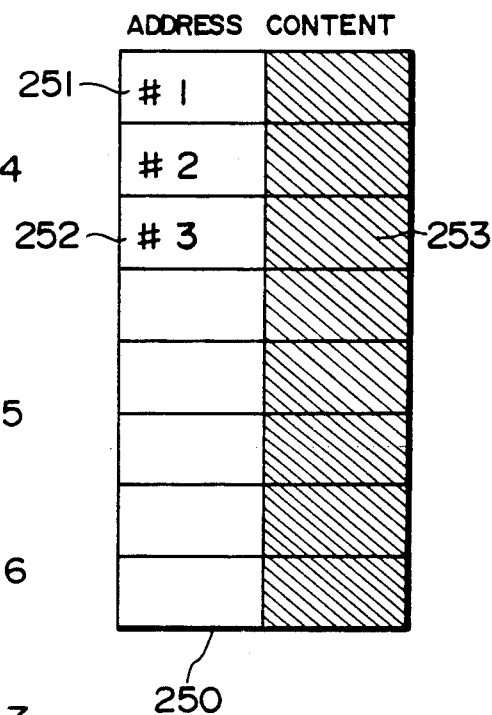
FIG. 17 shows the contents of addresses which may be loaded in an address counter.

FIG. 22 indicates how the OCR section 105 and the OMR section 262 are switched over and how the recognized information is corrected. First, the operator compares the recognized information indicated on the recognition result table 241 with the contents of the slip 224 shown in FIG. 10. When any of the characters on the slip 224 has been misread or rejected as represented by the character 246 or the reject symbol 245a, the operator sees if the recognition is the initial recognition or the correcting recognition. If it is the correcting recognition, the operator selects the OMR section 262 and then manipulates the operating section 260 to feed a switchover signal to the switching section 261 via the adding section 266. As a result, the switching section 261 brings the information delivery path into connection with the OMR section 262. When a character is rejected as represented by the character 245, the resulting reject signal is fed from the second memory 209 to the switching section 261 via the buses 217 and 264 and adding section 266. In this case, therefore, the OCR section 105 is automatically replaced with the OMR section 262. When the correction input mode (correcting recognition) is set as stated above, the address counter 250 shown in FIG. 17 is reset by the step S22-2.

Subsequently, the operator marks the frames of interest on the mark sheet 270 which is adapted for correction. Specifically, the operator marks a particular frame 271 in a row inputting area of the mark sheet 270 to designate the row of interest, a particular frame in a column inputting area 273 to designate the column of interest, and a particular frame in a numeral inputting section 274 to designate the character of interest. Thereafter, the reading section 100 reads the mark sheet 270 and delivers the resulting image signal to the OMR section 262 via the first memory 204 and switching sections 232 and 261. Then, the OMR section 262 reads the mark 271 in the row inputting section 272 of the mark sheet 270 on the basis of the image signal (step S22-3) and, in the same manner, reads the mark in the column inputting section 273 (step S22-4). The address calculating section 263 determines a particular address defined by the particular row and column (step S22-5), and then the address counter is shifted from the leading address to the determined address (step S22-6). Thereafter, the OMR section 262 recognizes the mark in the numeral inputting section 274 of the mark sheet 270 on the basis of the image signal and inputs the correct value (step S22-7). As a result, the recognized information having been stored in the address as indicated by the address counter 250 is rewritten (step S22-8). Such a procedure is repeated until all the illegible and rejected characters have been corrected (step S22-9). Finally, the corrected information is fed to the drawing section 210.

Subsequently, the step S22-1 is executed to set up the recognize mode (initial recognition) on the operating section 260. This causes the information delivery path into connection with the OCR section 105 instead of the OMR section 262. Then, an initialize command is fed to the second memory 209 via the data bus 222 to initialize it, so that the leading address is set in the address counter (step S22-11). In this condition, the line recognizing section 106 recognizes the lines 225 of FIG. 10 (step S22-12), as in the fourth embodiment of FIG. 15. The character extracting section 107 extracts the frames 242 defined by the lines 225 one by one (step S22-13), while the character recognizing section 108 recognizes the handwritten characters 243 existing in the individual frames 242 to thereby produce a character signal (step S22-14). Then, addresses associated with the individual frames 242 are set up (step S22-15), and the character signal and other recognized information are written in the associated addresses (step S22-16). After such recognition processing has been completed (step S22-17), the recognized information stored in the second memory 209 by the above procedure are fed to the drawing section 210.

The above sequence of steps is followed by interrupt processing, i.e., ordinary image generating processing as in the fourth embodiment of FIG. 18. Specifically, an image signal produced by the reading section 100 is transferred to the printing section 115 via the data address bus 229 which interconnects the switching section 232 and buffer 231.

The fifth embodiment described above has the following advantages.

(1) The OCR section 105 recognizes the contents of the slip 224, FIG. 10, while the arithmetic operating section 211 performs arithmtic operations with the recognized information. The drawing section 212 generates image data based on the results of arithmetic operations and delivers them to the printing section 115 for printing out a graph. Hence, the contents of a document in which numerical data have been written by hand, e.g., the slip 224 can be outputted in the form of a graph 123, for example, by the printing section 115. This allows any one to graph desired numerical data with ease.

(2) The kind of a graph is freely variable on the operating section 260. Stated another way, numerical data can be graphed in an optimal format on the basis of the contents and nature thereof, further promoting easy recognition by intuition. Since the recognized information is written in the second memory 209, they can be read out and outputted as various kinds of graphs any desired number of times. The categorized total table 124 shown in FIG. 8 is outputted together with the graph 123, so that one can see the objective data in addition to the intuition-oriented data.

(3) While the drawing section 210 is operated to perform arithmetic operations and generate image data, the operating section 260 may be manipulated to set up an interrupt mode in which interrupting means allows ordinary image generating processing to be executed in parallel. This is successful in increasing the efficiency of clerical work. When image data are fed from the drawing section 210, the image signal propagated through the data/address bus 229 is temporarily lodged in the buffer 231. Hence, data belonging to two different systems are prevented from conflicting with each other.

(4) The recognized information from the OCR section 105 is outputted in the same format as the slip 224 and, therefore, it can be readily compared with the contents of the slip 224. One can correct the recognized information easily and rapidly simply by smearing frames of interest provided on the mark sheet 270.

Sixth Embodiment

Figure 23:
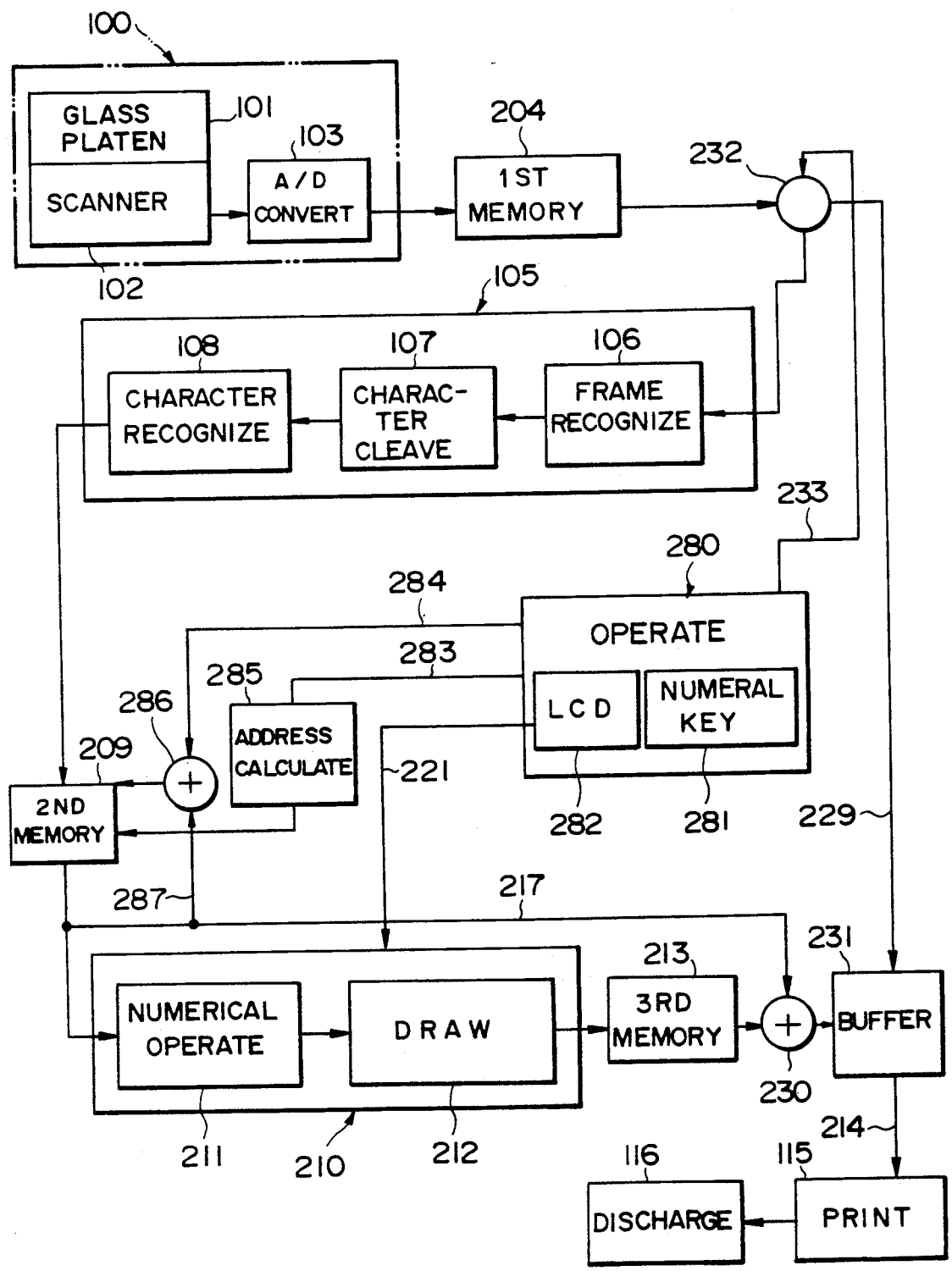
FIG. 23 is a schematic block diagram showing a sixth embodiment of the present invention.
Figure 24:
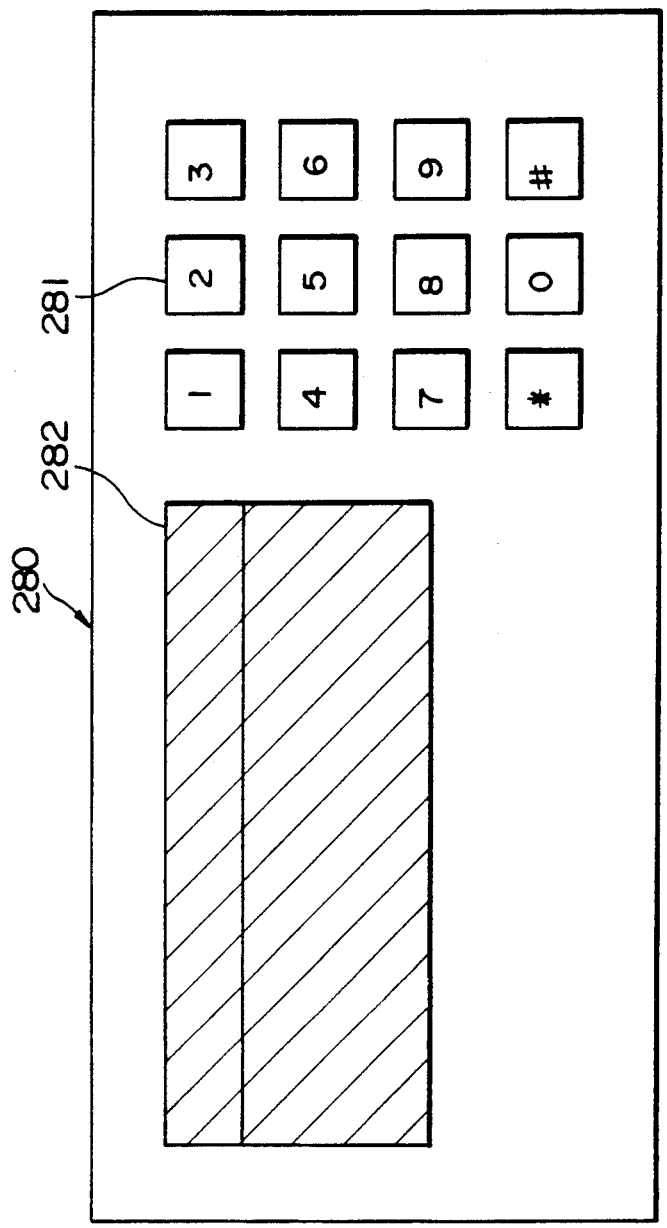
FIG. 24 shows an operating section included in the sixth embodiment.

Referring to FIGS. 23 and 24, a sixth embodiment of the present invention is shown. This embodiment is essentially similar to the fourth embodiment except for part of the construction and operation which will be described. In the figures, the same or similar components are designated by like reference numerals, and redundant description will be avoided for simplicity.

As shown in FIG. 23, the sixth embodiment has an operating section 280 or similar correcting means for entering correction data. The correction data include a location which needs correction, and a correct value. The operating section 280 has numeral keys 281 and a liquid crystal display (LCD) 282. Buses 283 and 284 are interconnected to the output of the operating section 280. The bus 283 is interconnected to the second memory 209 via an address calculating section 285 which determines, in response to the correction data, an address where the associated recognized information is stored. The bus 284 is interconnected to the second memory 209 via an adding section 286. A bus 287 branching off the data bus 217 is interconnected to the adding section. The data bus 217, adding section 230, buffer 231 and printing section 115 constitute outputting section for causing the printing section 115 to print out the recognized information.

In the sixth embodiment, the touch panel (display) 219, adding section 218 and control bus 220 included in the fourth embodiment are omitted.

The illustrative embodiment causes the OCR section 105 to recognize and output recognized information by the sequence of steps which have been described with reference to FIG. 15. Recognized information produced by the steps S15-1 to S15-9 is stored in predetermined addresses of the second memory 209, as in the fourth embodiment. Specifically, the recognized information is sequentially written in the memory 209 from the leading addresses each being associated with respective one of the filled items of the slip 224. When the reject signal has appeared, the content of the associated recognized information is outputted, i.e., the recognition result table 241 shown in FIG. 12 is printed out on a paper sheet by the printing section 115 in the same format as the slip 224 shown in FIG. 10. Then, the paper sheet is driven out through the discharging section 116. In the table 214, the handwritten characters 243 appear as characters 243a as shown in FIG. 12 while the blank portions 244 appear as blanks 244a. When any of the characters 245 on the slip 224 is illegible, a reject symbol 244 is printed out on the slip 224. When the reject signal does not appear, the drawing section produces image data in response to the recognized information so as to allow the printing section 115 to print out the graph 123 and table 124 shown in FIG. 8.

Figure 19:
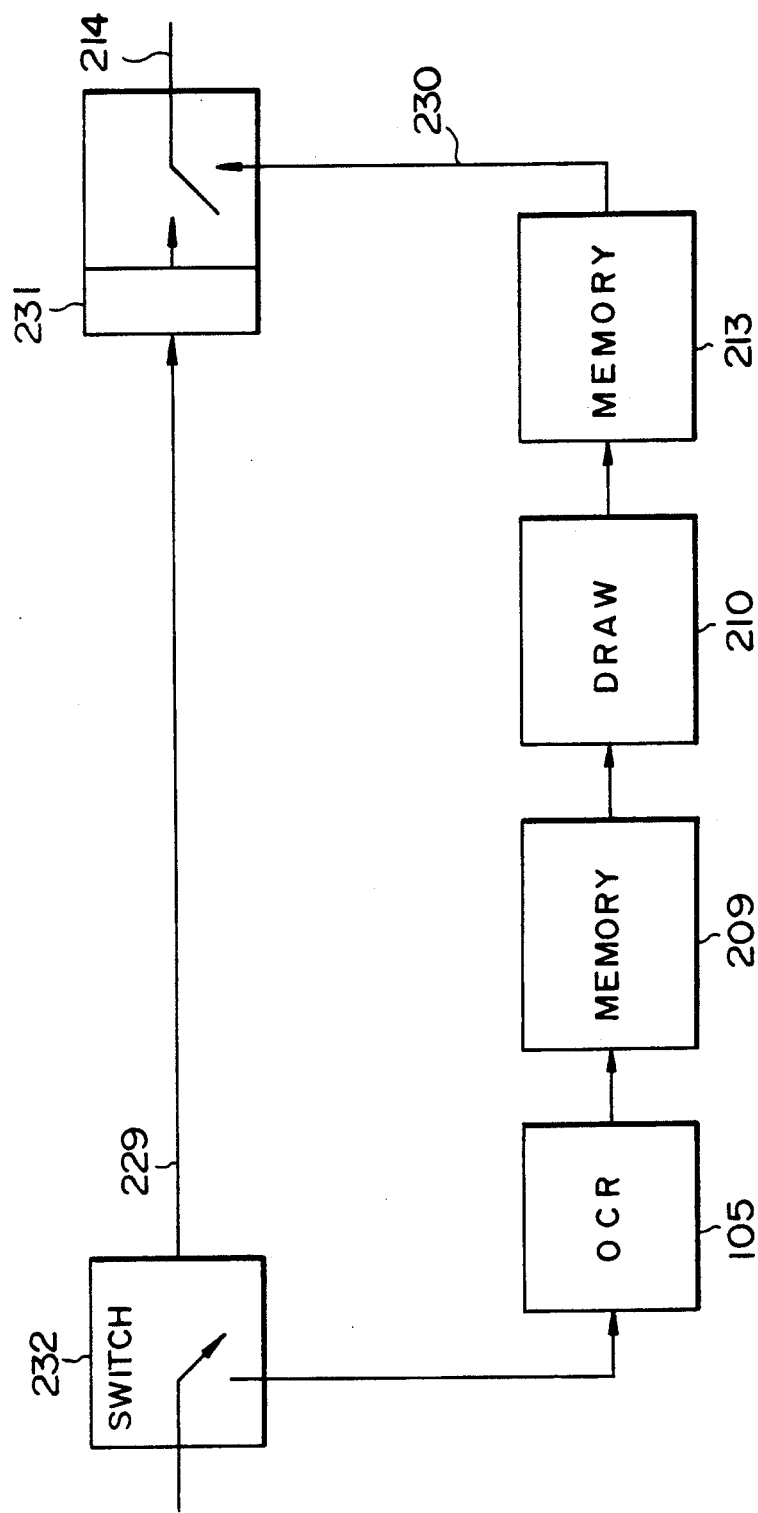
FIG. 19 is a schematic block diagram showing part of the fourth embodiment which is associated with the interrupt processing.

Recognized information in the recognition result table 241 may be corrected by the procedure which has been described with reference to FIG. 16. Specifically, the operator compares the recognized information, i.e., the table 241 with the slip 224 of FIG. 10. Assume that the character 246a in the table 241 has been misread, and that a rejection signal 245a is printed out in place of a particular character of the slip 224. Then, the operator manipulates the operating section 280, FIG. 24, to select a correction input mode (step S16-1, FIG. 16). When a character such as the character 245 is rejected, a reject signal is fed from the second memory 209 to the memory 209 itself via the buses 217 and 287 and adding section 286 and is thereby automatically caused into the correction input mode. In this condition, the address counter 250, FIG. 17, is loaded with the leading address of the recognized information stored in the second memory 209 (step S17-2, FIG. 17). This is followed by the same sequence of steps for correcting the recognized information as the sequence of the fourth embodiment. Further, as shown in FIG. 19, interrupt processing, i.e., ordinary image generating processing is executed for transferring the image signal from the reading section 100 to the printing section 115 via the data/address bus 229. The interrupt procedure proceeds as described with reference to FIG. 18.

The illustrative embodiment has various advantages, as enumerated below.

(1) The OCR section 105 recognizes the contents of the slip 224 shown in FIG. 10, while the numeral operating section 211 performs arithmetic operations by using the recognized contents. The drawing section 212 produces image data for graphing the results of the arithmetic operations and feeds them to the printing section 115. In response, the printing section 115 prints out the contents of the slip 224 in the form of a graph 123, for example, as shown in FIG. 8. Any person can, therefore, readily graph desired numerical data simply by writing them in the slip 242 or similar document.

(2) The kind of graph is selectable by entering a select command on the operating section 280. Hence, numerical data can be presented in an optimal format matching the contents and nature of numerical data, further facilitating intuitive recognition of the numerical data. Since the recognized information is written in the second memory 209, they can be read out and outputted as various kinds of graphs any desired number of times. The categorized total table 124 shown in FIG. 8 is outputted together with the graph 123, so that one can see the objective data in addition to the intuition-oriented data.

(3) While the drawing section 210 is operated to perform arithmetic operations and generate image data, the operating section 280 may be manipulated to set up an interrupt mode in which interrupting means allows ordinary image generating processing to be executed in parallel. This is successful in increasing the efficiency of office work. When image data are fed from the drawing section 210, the image signal propagated through the data/address bus 229 is temporarily lodged in the buffer 231. Hence, data belonging to two different systems are prevented from conflicting with each other.

(4) Since the recognized information from the COR section 105 is outputted in the same format as the slip 224 by the printing section, one can compare them with ease. Furthermore, recognized information can be corrected simply by entering the row and column where an illegible or rejected numeral exists and a correct value and, therefore, easily within a short period of time.

Seventh Embodiment

Referring to FIGS. 25 to 30, a seventh embodiment of the present invention is shown. This embodiment is essentially the same as the fourth embodiment except for part of the construction and operation which will be described. In the figures, the same or similar components are designated by like reference numerals, and redundant description will be avoided for simplicity.

Figure 25:
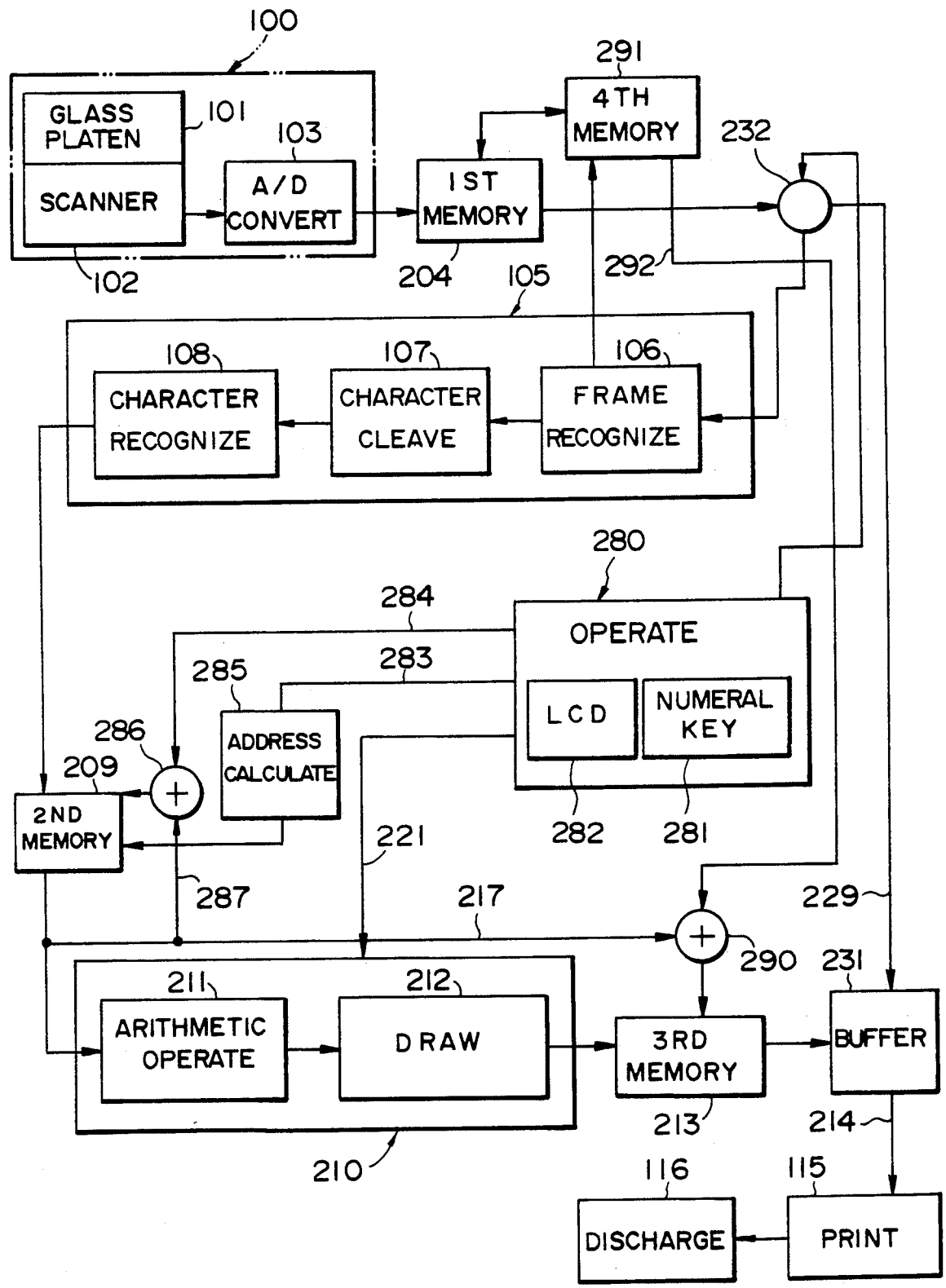
FIG. 25 is a schematic block diagram showing a seventh embodiment of the present invention.

As shown in FIG. 25, the seventh embodiment has the operating section 280 or similar correcting means for entering correction data. The correction data include a location which needs correction, and a correct value. The operating section 280 has the numeral keys 281 and 282. Buses 283 and 284 are interconnected to the output of the operating section 280. The bus 283 is interconnected to the second memory 209 via the address calculating section 285 which determines an address where the associated recognized information is stored. The bus 284 is interconnected to the second memory 209 via the adding section 286. The bus 287 branching off the data bus 217 is interconnected to the adding section 286. A fourth memory 291 is interconnected to the first memory 204 in order to store information associated with the lines 225 which have been recognized by the line recognizing section 106. The line recognizing section 106 is interconnected to the input side of the fourth memory 291, while a bus 292 is interconnected to the output of the memory 291. The bus 292 is interconnected to the input of the third memory 213 via an adding section 290. The data bus 217 is also connected to the input of the third memory 213 via the adding section 290. The fourth memory 291 and printing section 115 constitute displaying means for displaying recognized information and an image based on the image signal.

In the seventh embodiment, the touch panel (display) 219, adding section 218 and control bus 220 included in the fourth embodiment are omitted.

The illustrative embodiment causes the OCR section 105 to recognize and output recognized information by the sequence which has been described with reference to FIG. 15. Recognized information produced by the steps S15-1 to S15-9 is stored in predetermined addresses of the second memory 209, as in the fourth embodiment. Specifically, the recognized information is sequentially written in the memory 209 from the leading addresses each being associated with respective one of the filled frames of the slip 224.

Figure 30:
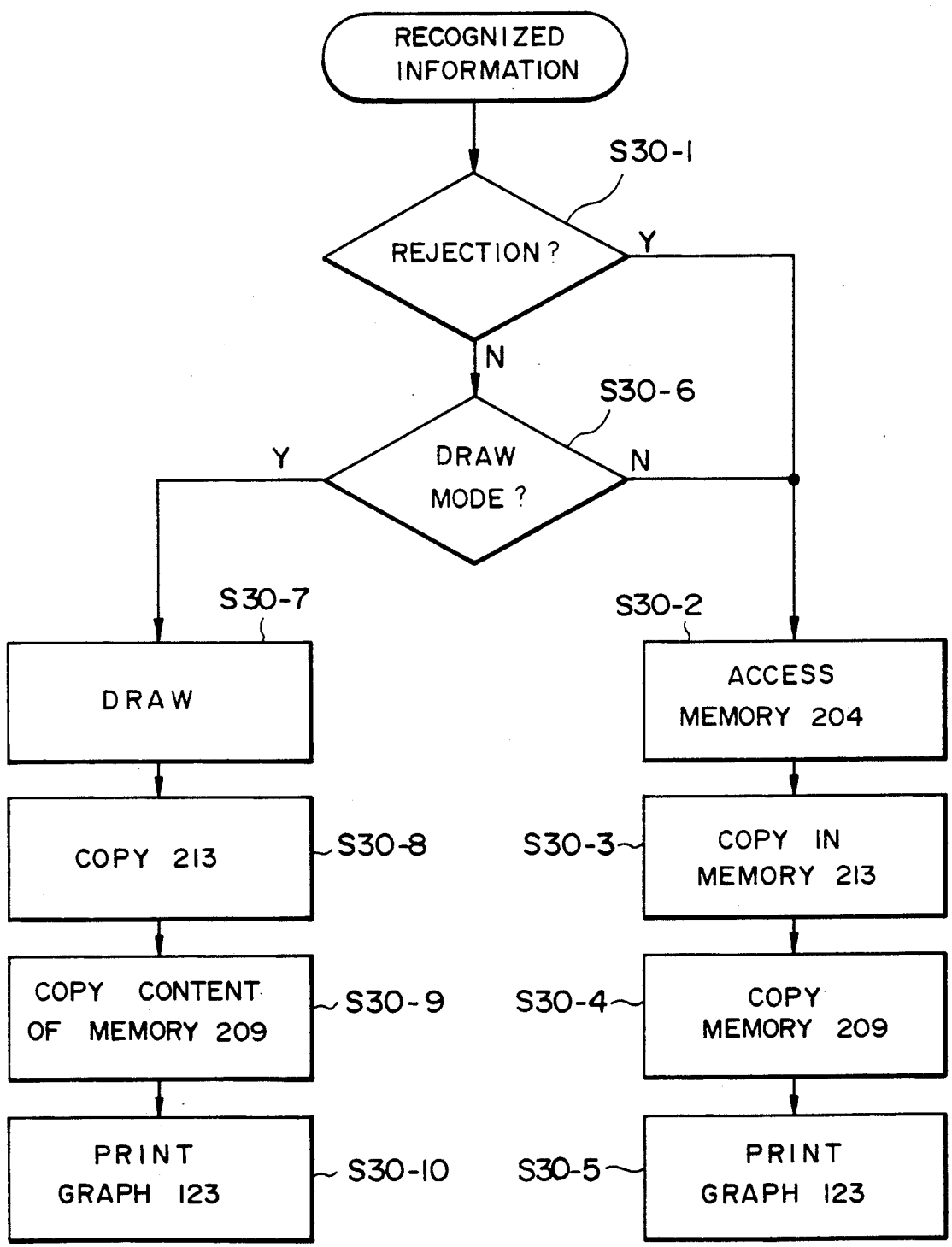
FIG. 30 is a flowchart showing a procedure for outputting the categorized total table and recognition result table shown in FIGS. 8 and 26, respectively.

FIG. 30 shows a procedure for printing out the graph 123 and categorized total table 124 of FIG. 8 and a recognition result table of FIG. 26. The procedure beings with a step S30-1 for determining whether or not the character recognizing section 108 has generated a reject signal. If the answer of the step S30-1 is YES, the first memory 204 is accessed on the basis of the fourth memory 291 (step S30-2). The image signal stored in the first memory 204 is copied on the third memory 213 (step S30-3). The image signal stored in the second memory 209 is copied on the third memory 213 (step S30-4). Then, a recognition result table 299, FIG. 26, is printed out by the printing section 115 (step S30-5). In the table 299, characters 243b of FIG. 26 which are based on the image signal are printed out in correspondence with the handwritten characters 243 of the slip 224 of FIG. 10, while characters 243a are printed on the basis of the result of recognition. Likewise, blanks 244a in the table 299 correspond to the blank portions 244 of the slip 224. When a particular character 245 of the slip 224 is illegible, a reject symbol 245a is printed out. When a character signal or a blank signal has been generated and the character recognizing section 108 has not outputted a reject signal as determined by the step S30-1, whether or not a draw mode has been set up is determined (step S30-6). If the answer of the step S30-6 is NO, the step S30-2 to S30-5 are executed. If the answer of the step S30-6 is YES, drawing processing is executed (step S30-7), the image data from the drawing section 210 are copied on the third memory 13 on the basis of the recognized information (step S30-8), the recognized information stored in the second memoy 209 is copied on the third memory 213 (step S30-9), and the printing section 115 prints out the graph 123 and categorized total table table 124 of FIG. 8 (step S30-10).

Figure 27:
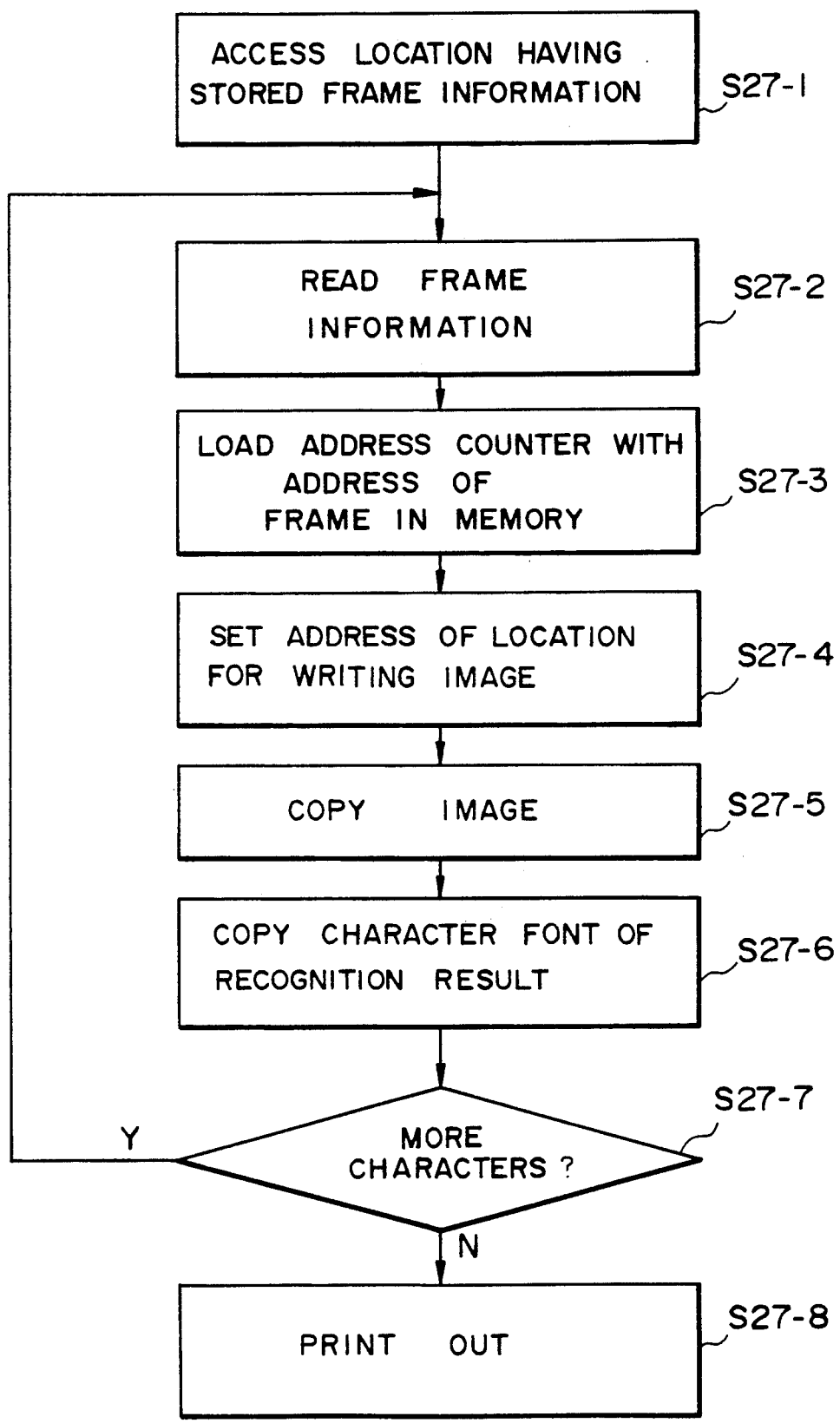
FIG. 27 is a flochart representative of an operation for producing the table shown in FIG. 26.
Figure 28:
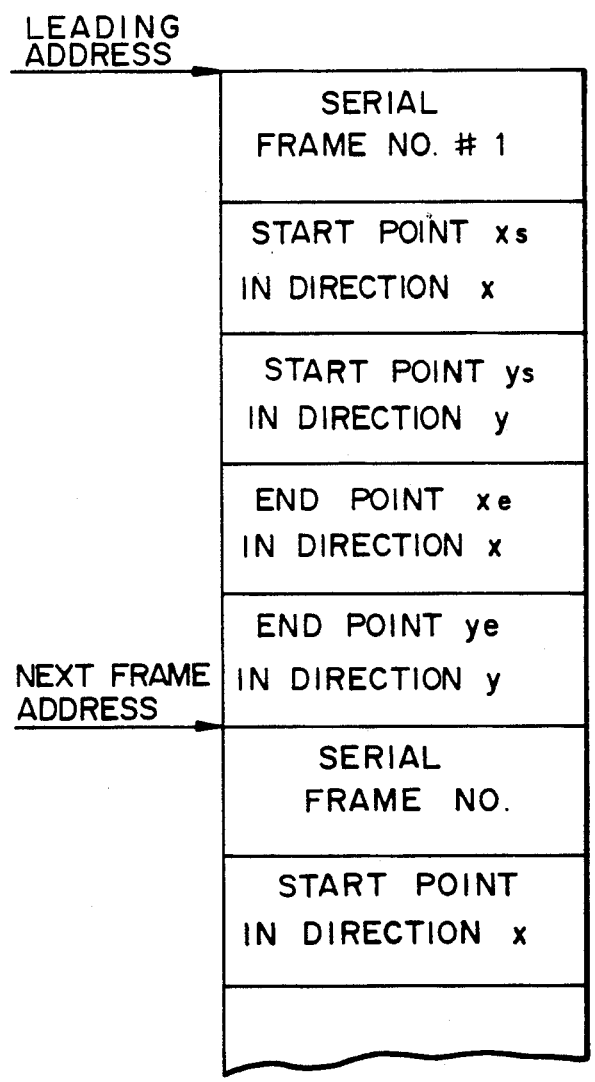
FIGS. 28 and 29 are diagrams indicative of the arrangement of information associated with frames of a document.
Figure 29:
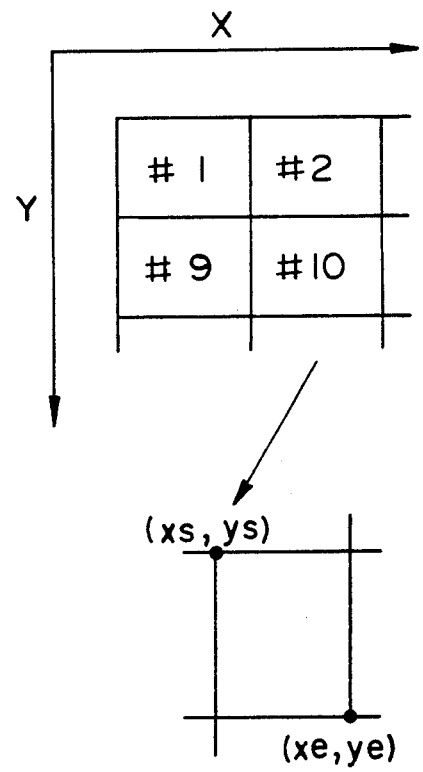

The procedure for printing out the recognition result table 299 will be described in more detail with reference to FIG. 27. As shown, the fourth memory 291, i.e., a location where frame information has been stored is accessed (step S27-1). Then, information stored in the first memory 204 and associated with the lines 225 as will be described with reference to FIGS. 28 and 29 is read out (step S27-2). Subsequently, the position address of the third memory 213 is loaded in the address counter (step S27-3). By using this position address as a leading address, a destination address of the third memory 213 is set up (step S27-4). Thereafter, a portion of the image signal stored in the second memory 209 and associated with the line information which has been read out of the first memory 204 is copied (step S27-5). The recognized information stored in the memory 209, e.g., a character font associated with the result of recognition is copied on the third memory 213 in correspondence with the image signal (step S27-6). Such a procedure is repeated with all the characters written in the slip 224 (step S27-7). Finally, the characters and lines are printed out on the basis of the information stored in the third memory 213. As shown in FIGS. 28 and 29, the information associated with the lines 225 and stored in the fourth memory 291 includes X-Y coordinates indicative of the positions, lengths and heights of the individual frames.

The recognized information printed out in the recognition result table 299 may be corrected as shown in FIG. 16, i.e., in the same manner as in the fourth embodiment. Also, the initialization of the second memory 209 and the interrupt processing are executed in the same manner as in the fourth embodiment.

The illustrative embodiment has various advantages as enumerated below.

(1) The OCR section 105 recognizes the contents of the slip 224 shown in FIG. 10, while the arithmetic operating section 211 performs numerical operations by using the recognized contents. The drawing section 212 produces image data for graphing the results of the arithmetic operations and feeds them to the printing section 115. In response, the printing section 115 prints out the contents of the slip 224 in the form of a graph 123, for example, as shown in FIG. 8. Any person can, therefore, readily graph desired numerical data simply by writing them in the slip 242 or similar document.

(2) The kind of a graph is selectable by entering a select command on the operating section 280. Hence, numerical data can be presented in an optimal format matching the contents and nature of numerical data, further facilitating intuitive recognition of the numerical data. Since the recognized information is written in the second memory 209, they can be read out and outputted as various kinds of graphs any desired number of times. The categrozied total table 124 shown in FIG. 8 is outputted together with the graph 123, so that one can see the objective data in addition to the intuition-oriented data.

(3) While the drawing section 210 is operated to perform arithmetic operations and generate image data, the operating section 280 may be manipulated to set up an interrupt mode in which interrupting means allows ordinary image generating processing to be executed in parallel. This is successful in increasing the efficiency of office work. When image data are fed from the drawing section 210, the image signal propagated through the data/address bus 229 is temporarily lodged in the buffer 231. Hence, data belonging to two different systems are prevented from conflicting with each other.

(4) The contents of an image signal from the reading section 100 and the recognized information from the OCR section 105 are printed out as the recognition result table 299, as shown in FIG. 26. This allows one to confirm the contents of recognized information immediately. Since the contents of an image signal are displayed, one can see by eye whether or not the image signal has suffered from the break-off, blur and/or batter of characters, noise, and so forth when the scanner 102 has read the characters. Hence, it is easy to see the cause of illegibility or misreading which may occur in the OCR section 105.

(5) Furthermore, recognized information can be corrected simply by entering the row and column where an illegible or rejected numeral exists and a corrected value on the numeral keys 281 shown in FIG. 24 and, therefore, easily within a short period of time.

In summary, it will be seen that the present invention provides an image generating apparatus having various advantages as enumerated below.

(1) Recognizing means recognizes the contents of a document, while arithmetic operating means performs arithmetic operations based on the recognized information. Drawing means produces image data for graphing the results of arithmetic operations and delivers them to printing means, whereby the contents of a document are outputted in the form of a graph, for example. Hence, a slip or similar document in which numerical data have been written by hand can be transformed into a graph as printed out by the printing means. This allows any one to graph numerical data with ease.

(2) A categorized total table showing the recognized information is outputted together with the graph. Therefore, one can see objective data as well as the data which is easy to recognize by intuition.

(3) When the recognized information is calculated or the image data is produced in a graph mode, one may manipulate operating means to set up an ordinary copy mode. It is possible, therefore, to execute ordinary image generating processing in parallel with the calculation or data generation, whereby efficient office work is promoted.

(4) The operator is capable of selecting a graph of a desired kind on the operating means. Hence, numerical data can be presented in a format matching the contents and nature thereof, further promoting intuitive recognition of the numerical data.

(5) The manipulations for entering data to be graphed are extremely easy. The apparatus, therefore, will enhance efficient man-machine communication when applied to a digital copier, for example.

(6) Even when characters are handwritten in an exclusive slip for an OCR in an ordinary style, they can be recognized correctly. It follows that reliable graphing and totalizing operations are achievable with the outputs of the OCR.

(7) The contents recognized by the recognizing means can be corrected with ease.

(8) The recognized information from the recognizing means may be optically displayed to allow one to examine the contents of the information rapidly.

(9) An exclusive document for correction may be marked and read by the reading means so as to correct recognized information. Hence, recognized information can be corrected by simple manipulations and within a short period of time.

(10) One can correct the recognized information simply by entering the row and column of interest and a correct value, i.e., rapidly within a short period of time.

(11) The recognized information and an image based on the image signal can be displayed on displaying means. This promotes rapid confirmation of the contents of the recognized information and easy estimation of the cause of illegibility and/or misreading which may occur in the recognizing means.

Various modifications will become possible for those skilled in the art after receiving the teachings of the present disclosure without departing from the scope thereof.

What is claimed is:

1. An image generating apparatus comprising:
image inputting means for producing binary image data by optically reading a document in which numerical values for graphing, characters representative of a title and so forth are handwritten;
character image cleaving means for cleaving images representative of the characters and numerals located at predetermined positions out of the binary image data;
character recognizing means for outputting character codes and numeral codes by recognizing the cleaved images;
graph formating means for producing a graph image on the basis of character and numeral data recognized by said character recognizing means; and
mode selecting means for selecting either one of an ordinary copy mode and a graph mode.

2. An image generating apparatus comprising:
reading means for producing an image signal by reading a slip in which numerals are handwritten in a predetermined format;
analog-to-digital converting means for converting the image signal into a digital image signal;
preserving means for preserving the digital image signal;
recognizing means for recognizing the digital image signal preserved by said preserving means;
graph formating means for totalizing results of recognition by said recognizing means and formating said totalized results into a graph;
printing means for printing out the graph formated by said graph formating means and the results of recognition in combination;
storing means for storing a pattern of the slip on which frames for writing numerals are defined by lines and a style of handwriting of the numerals is indicated together with said lines;
operating means for commanding print-out of the pattern of the slip stored in said storing means; and
selecting means for selecting either one of an ordinary copy mode and a graph mode.

3. An image generating apparatus comprising:
reading means for reading a slip in which numerals are handwritten in a predetermined format;
recognizing means for recognizing contents read by said reading means;
graph formating means for performing arithmetic operations with the recognized contents and formating said recognized contents into a graph on the basis of results of said arithmetic operations;
operating means for instructing said graph formating means the kind of a graph to be produced;
printing means for combining and printing out the graph formated by said graph formating means and data representative of the results of recognition by said recognizing means; and correcting means for correcting the recognized contents.

4. An apparatus as claimed in claim 3, wherein said correcting means corrects the recognized contents in response to a manual input on said operating means.

5. An apparatus as claimed in claim 3, wherein said correcting means corrects the recognized contents automatically via a control bus.

6. An image generating apparatus comprising:

reading means for reading a slip in which numerals are handwritten in a predetermined format;

image storing means for storing contents read by said reading means as an image;

line recognizing means for recognizing, on the basis of the contents read by said reading means, lines which define frames on the slip;

separating means for separating the lines recognized by said line recognizing means and character portions;

character recognizing means for recognizing characters included in said separated character portions;

displaying means for optically displaying results of recognition by said character recognizing means;

character storing means for storing the results of recognition by said character recognizing means;

location indicating means for indicating locations of said character storing means where the results of recognition are stored;

correcting means for correcting the recognized contents stored in said character storing means;

arithmetic operating means for performing arithmetic operations with the recognized contents stored in said character storing means;

graph formating means for formating the recognized contents into a graph on the basis of results of the arithmetic operations;

printing means for combining and printing out the graph formated by said graph formating means and the results of recognition by said character recognizing means;

graph selecting means for selecting a graph of a desired kind;

interrupting means for executing, while recognizing and graphing processing is under way, another image generating processing; and mode selecting means for selecting either one of an ordinary copy mode and a graph mode.

7. An image generating apparatus comprising:

reading means for reading a slip;

image storing means for storing contents read by said reading means as an image;

line recognizing means for recognizing lines which define frames on the slip and are included in image data stored in said image storing means;

separating means for separating the lines recognized by said line recognizing means and character portions;

character recognizing means for recognizing characters included in the character portions;

character storing means for storing results of recognition by said character recognizing means;

printing means for printing out the results of recognition stored in said character storing means;

correcting means for correcting the recognized contents stored in said character storing means;

identifying means for identifying contents of a mark sheet;

address calculating means for determining, on the basis of a mark on the mark sheet identified by said identifying means, an address of a location where one of the results of recognition is stored;

arithmetic operating means for performing arithmetic operations with the recognized contents stored in said character storing means;

graph formating means for formating the recognized contents into a graph on the basis of results of the arithmetic operations;

printing means for combining and printing out the graph formated by said graph formating means and the results of recognition;

graph selecting means for selecting a graph of a desired kind;

interrupting means for executing, while recognizing and graphing processing is under way, another image generating processing;

mode selecting means for selecting either one of an oridinary copy mode and a graph mode;

switching means for switching over mark identifying processing and character recognizing processing; and conflict preventing means for preventing the graphed data from conflicting with data particular to said another image generating processing.

8. An image generating apparatus comprising:

reading means for reading a slip in which numerals are handwritten in a predetermined format;

image storing means for storing contents read by said reading means as an image;

line recognizing means for recognizing, on the basis of the contents read by said reading means, lines which define frames;

separating means for separating the lines and character portions on the basis of results of recognition by said recognizing means;

character recognizing means for recognizing characters included in the character portions;

character storing means for storing results of recognition by said character recognizing means;

printing means for printing out the results of recognition by said character recognizing means;

image displaying means for displaying an image which is read by said reading means and to be recognized, in addition to the results of recognition;

correcting means for correcting contents recognized by said character recognizing means;

location indicating means for indicating a location where a content to be corrected is stored;

inputting means for inputting a portion to be corrected and a correct value;

calculating means for performing arithmetic operations with the contents recognized by said character recognizing means;

graph formating means for formating the recognized contents into a graph on the basis of results of arithmetic operations;

printing means for printing out the graph formated by said graph formating means and the results of recognition;

graph selecting means for selecting a graph of a desired kind;

interrupting means for executing, while recognizing and graphing processing is under way, another image generating processing;

mode selecting means for selecting either one of an ordinary copy mode and a graph mode; and conflict preventing means for preventing results of the recognizing and graphing procedure from conflicting with results of said another image generating processing.

9. An image generating apparatus comprising:

reading means for reading a slip in which numerals are handwritten in a predetermined format;

image storing means for storing contents read by said reading means as an image;

line recognizing means for recognizing, on the basis of the contents read by said reading means, lines which define frames;

separating mean for separating the lines and character portions on the basis of results of recognition by said line recognizing means;

character recognizing means for recognizing characters included in the character portions;

storing means for storing results of recognition by said character recognizing means;

printing means for printing out the results of recognition by said character recognizing means;

correcting means for correcting contents recognized by said character recognizing means;

location indicating means for indicating a location of said storing means where any of the contents to be corrected is stored;

inputting means for inputting a portion to be corrected and a correct value;

calculating means for performing arithmetic operations with the contents recognized by said character recognizing means;

graph formating means for formating the recognized contents into a graph on the basis of results of the arithmetic operations;

printing means for combining and printing out the graph formated by said graph formating means and the results of recognition;

graph selecting means for selecting a graph of a desired kind;

interrupting unit for executing, while recognizing and graphing processing is under way, another image generating processing;

mode selecting means for selecting either one of an ordinary copy mode and a graph mode; and conflict preventing means for preventing results of the recognizing and graphing processing from conflicting with results particular to said another image generating processing.

* * * * *